US011257253B2

(12) United States Patent
Kilgard

(10) Patent No.: US 11,257,253 B2
(45) Date of Patent: Feb. 22, 2022

(54) METHOD AND SYSTEM FOR UNIFIED ENCODING OF PATH SEGMENTS, CAPS, AND JOINS FOR PATH STROKING

(71) Applicant: Nvidia Corporation, Santa Clara, CA (US)

(72) Inventor: Mark Kilgard, Austin, TX (US)

(73) Assignee: Nvidia Corporation, Santa Clara, CA (US)

( * ) Notice: Subject to any disclaimer, the term of this patent is extended or adjusted under 35 U.S.C. 154(b) by 46 days.

(21) Appl. No.: 16/914,980

(22) Filed: Jun. 29, 2020

(65) Prior Publication Data

US 2021/0174550 A1 Jun. 10, 2021

Related U.S. Application Data

(63) Continuation-in-part of application No. 16/714,621, filed on Dec. 13, 2019.

(60) Provisional application No. 62/946,267, filed on Dec. 10, 2019.

(51) Int. Cl.
*G06T 17/00* (2006.01)
*G06T 9/00* (2006.01)
*G06T 17/20* (2006.01)
*G06T 1/20* (2006.01)
*G06T 15/00* (2011.01)
*G06T 17/10* (2006.01)

(52) U.S. Cl.
CPC .............. *G06T 9/00* (2013.01); *G06T 1/20* (2013.01); *G06T 15/005* (2013.01); *G06T 17/10* (2013.01); *G06T 17/205* (2013.01)

(58) Field of Classification Search
None
See application file for complete search history.

(56) References Cited

U.S. PATENT DOCUMENTS

| | | | | |
|---|---|---|---|---|
| 5,734,756 A * | 3/1998 | Sherman | ............... | G06T 11/203 |
| | | | | 382/259 |
| 5,886,702 A * | 3/1999 | Migdal | ................... | G06T 17/20 |
| | | | | 345/423 |
| 6,266,062 B1 * | 7/2001 | Rivara | .................... | G06T 17/20 |
| | | | | 345/419 |
| 7,212,205 B2 * | 5/2007 | Uesaki | .................... | G06T 17/30 |
| | | | | 345/419 |
| 7,764,286 B1 * | 7/2010 | Kumar | .................... | G06T 11/00 |
| | | | | 345/426 |
| 7,868,887 B1 * | 1/2011 | Yhann | .................. | G06T 11/203 |
| | | | | 345/442 |
| 7,872,648 B2 * | 1/2011 | Hoppe | ...................... | G06T 9/00 |
| | | | | 345/423 |

(Continued)

*Primary Examiner* — Martin Mushambo

(57) ABSTRACT

The disclosure provides methods of encoding a path, a stroking system for paths, a renderer that generates a stroked tessellation of a path, and a method of determining a type of link of a path from a data structure. The data structure can be an array of indexed links that compactly encode a path. The position of one or more index values, such as a null index value, within an indexed link can encode the link's type. In one example, a method of encoding includes: (1) receiving a path having multiple links, wherein the links include at least one segment and at least one junction, and (2) generating an encoded path by encoding the links based on positional information of the links, wherein the encoding employs a same data structure for each of the links.

40 Claims, 16 Drawing Sheets

(56) References Cited

U.S. PATENT DOCUMENTS

| | | | | |
|---|---|---|---|---|
| 7,952,580 B1* | 5/2011 | Yhann | G06T 11/203 | 345/423 |
| 8,584,012 B1* | 11/2013 | Orshanskiy | G06T 11/203 | 715/264 |
| 8,665,276 B2* | 3/2014 | Chiang | G06T 11/203 | 345/442 |
| 10,212,457 B1* | 2/2019 | Livshitz | G06T 5/007 | |
| 10,380,769 B1* | 8/2019 | Beri | G06T 11/203 | |
| 2002/0094926 A1* | 7/2002 | Kling | G06T 17/20 | 493/356 |
| 2004/0001061 A1* | 1/2004 | Stollnitz | G06T 17/30 | 345/423 |
| 2004/0090437 A1* | 5/2004 | Uesaki | G06T 17/30 | 345/420 |
| 2006/0125824 A1* | 6/2006 | Sfarti | G06T 17/205 | 345/423 |
| 2006/0158450 A1* | 7/2006 | Ferguson | G06T 13/00 | 345/423 |
| 2007/0115289 A1* | 5/2007 | Goldfarb | G06T 13/40 | 345/473 |
| 2008/0198168 A1* | 8/2008 | Jiao | G06T 11/40 | 345/506 |
| 2009/0027397 A1* | 1/2009 | Frisken | G06K 9/00416 | 345/442 |
| 2009/0027398 A1* | 1/2009 | Frisken | G06T 11/203 | 345/442 |
| 2010/0216575 A1* | 8/2010 | Sato | A63B 37/0021 | 473/383 |
| 2010/0283780 A1* | 11/2010 | Ohmori | G06T 15/20 | 345/419 |
| 2010/0289802 A1* | 11/2010 | Falchetto | G06T 11/203 | 345/442 |
| 2011/0090228 A1* | 4/2011 | Persson | G06T 11/203 | 345/443 |
| 2011/0164041 A1* | 7/2011 | Miura | G06T 11/203 | 345/442 |
| 2011/0251829 A1* | 10/2011 | Baxter, III | G06T 11/001 | 703/1 |
| 2011/0285721 A1* | 11/2011 | Kilgard | G06T 15/005 | 345/442 |
| 2011/0285724 A1* | 11/2011 | Kilgard | G06T 11/203 | 345/443 |
| 2011/0285736 A1* | 11/2011 | Kilgard | G06T 11/203 | 345/584 |
| 2011/0285747 A1* | 11/2011 | Kilgard | G06T 11/203 | 345/613 |
| 2012/0268794 A1* | 10/2012 | Soulard | G06T 11/203 | 358/1.18 |
| 2013/0120383 A1* | 5/2013 | Joshi | G06T 17/00 | 345/423 |
| 2013/0120391 A1* | 5/2013 | Brown | G06T 11/203 | 345/441 |
| 2013/0127869 A1* | 5/2013 | Winnemoeller | G06T 11/203 | 345/441 |
| 2013/0293554 A1* | 11/2013 | Vostrikov | G06T 11/203 | 345/442 |
| 2014/0043330 A1* | 2/2014 | Ceylan | G06T 17/20 | 345/423 |
| 2014/0043341 A1* | 2/2014 | Goel | G06T 1/00 | 345/501 |
| 2014/0043342 A1* | 2/2014 | Goel | G06T 11/203 | 345/501 |
| 2015/0015579 A1* | 1/2015 | Brown | G06F 11/36 | 345/423 |
| 2015/0023595 A1* | 1/2015 | Perry | G06T 11/203 | 382/173 |
| 2015/0062142 A1* | 3/2015 | Goel | G06T 15/005 | 345/582 |
| 2015/0062600 A1* | 3/2015 | Takeichi | G06T 11/203 | 358/1.9 |
| 2015/0063706 A1* | 3/2015 | Lampinen | G06T 11/203 | 382/197 |
| 2015/0077420 A1* | 3/2015 | Bolz | G06T 11/203 | 345/442 |
| 2015/0178961 A1* | 6/2015 | Karras | G06T 11/203 | 345/442 |
| 2015/0178974 A1* | 6/2015 | Goel | G06T 11/203 | 345/420 |
| 2016/0343161 A1* | 11/2016 | Paladini | G06T 1/60 | |
| 2017/0039765 A1* | 2/2017 | Zhou | G06T 7/55 | |
| 2017/0200292 A1* | 7/2017 | Betts | G06T 11/203 | |
| 2017/0270710 A1* | 9/2017 | Beri | G06T 11/40 | |
| 2017/0278283 A1* | 9/2017 | Bloomfield | G06T 11/203 | |
| 2018/0089890 A1* | 3/2018 | Shreiner | G06T 17/20 | |
| 2018/0232912 A1* | 8/2018 | Nevraev | G06T 9/001 | |
| 2019/0088014 A1* | 3/2019 | Richards | G06T 19/00 | |
| 2019/0236820 A1* | 8/2019 | Lengyel | G06T 11/203 | |
| 2019/0236827 A1* | 8/2019 | Hakura | G06T 15/04 | |
| 2019/0236829 A1* | 8/2019 | Hakura | G06T 15/005 | |
| 2019/0371008 A1* | 12/2019 | Peterson | G06T 9/20 | |
| 2019/0371009 A1* | 12/2019 | Peterson | G06T 11/60 | |

\* cited by examiner

| INDEX | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| COORDINATE VALUE | NULL | NULL | 137 | 318 | 174 | 176 | 319 | 372 | 413 | 232 | 448 | 353 | 582 | 410 | 645 | 227 |

CONTROL POINT COORDINATE ARRAY 1010

| LINK NUMBER | 0 | | | | | | 1 | | | | | | 2 | | | | | | 3 | | | | | | 4 | | | | | |
|---|---|---|---|---|---|---|---|---|---|---|---|---|---|---|---|---|---|---|---|---|---|---|---|---|---|---|---|---|---|---|
| COORDINATE INDEX | 2 | 0 | 0 | 4 | 0 | 0 | 0 | 2 | 4 | 6 | 8 | 8 | 8 | 8 | 6 | 10 | 10 | 8 | 10 | 12 | 14 | 12 | 10 | 8 | 14 | 0 | 14 | 0 | 12 | 0 |
| INDEX | 0 | 1 | 2 | 3 | 4 | 5 | 0 | 1 | 2 | 3 | 4 | 5 | 0 | 1 | 2 | 3 | 4 | 5 | 0 | 1 | 2 | 3 | 4 | 5 | 0 | 1 | 2 | 3 | 4 | 5 |

1520 INDEXED LINK FOR PATH 100

FIG. 15

METHOD AND SYSTEM FOR UNIFIED ENCODING OF PATH SEGMENTS, CAPS, AND JOINS FOR PATH STROKING

CROSS-REFERENCE TO RELATED APPLICATION

This application is a continuation-in-part of U.S. application Ser. No. 16/714,621, filed by Mark Kilgard on Dec. 13, 2019, entitled "POLAR STROKING FOR VECTOR GRAPHICS", which claims priority to U.S. Provisional Application Ser. No. 62/946,267, filed by Mark Kilgard on Dec. 10, 2019, entitled "POLAR STROKING FOR VECTOR GRAPHICS," commonly assigned with this application and both incorporated herein by reference in their entirety.

TECHNICAL FIELD

This application is directed, in general, to representing paths that include segments and junctions and, more specifically, to encoding the paths.

BACKGROUND

Vector graphics (as used in PostScript, PDF, Scalable Vector Graphics, OpenVG, Flash, etc.) renders shapes and text in one of two ways: filling (essentially "coloring inside a shape") or stroking (essentially "outlining a shape"). These shapes are commonly called "paths" and the process of rendering filled or stroked paths is often called "path rendering".

Existing methods perform stroking by slow CPU rasterization techniques or faster GPU methods that involve significant CPU pre-processing. The need for CPU-based pre-processing often leaves GPU stroking methods bound by CPU operations. Furthermore, the CPU-based pre-processing for GPU stroking methods typically combines rendering states, such as stroke width, cap style, and join style, into the path's GPU representation that then becomes expensive to change, for example, by re-tessellation. Such GPU representations also take substantially more memory to store than the path's original representation.

SUMMARY

In one aspect, the disclosure provides a method of encoding a path. In one example, the method includes: (1) receiving a path having multiple links, wherein the links include at least one segment and at least one junction, and (2) generating an encoded path by encoding the links based on positional information of the links, wherein the encoding employs a same data structure for each of the links.

In another aspect, the disclosure provides a stroking system for paths. In one example, the stroking system includes: (1) a path processor configured to decompose a path into links and encode the links, wherein the links include at least one segment and at least one junction, wherein the path processor is configured to encode the path employing a same data structure for each of the links, and (2) a stroking processor configured to tessellate the encoded path into geometric primitives corresponding to a stroked region of the path.

In yet another aspect, the disclosure provides a renderer. In one example, the renderer includes: (1) a first processor configured to decompose a path into links, wherein the links include one or more segment and one or more junction, and encode the links as indexed links, and (2) a second processor configured to generate a stroked tessellation of the path based on a polar stroked representation of each of the links employing the indexed links.

In still another aspect, the disclosure provides a method of determining a type of link of a path from a data structure. In one example, the method of determining a type of link includes: (1) analyzing a data structure that encodes a link, the data structure having multiple indices that refer to a control point coordinate array corresponding to the link, and (2) determining a type of the link based on the presence of at least one index null value for at least one of the indices.

In still yet another aspect, the disclosure provides a method of encoding a path that includes a plurality of segments and a plurality of junctions connecting respective consecutive adjacent pairs of the segments. In one example, the method of encoding includes: (1) for each of the segments, and using a same representation format for each of the segments, encoding the segment as a first indexed link, and (2) for each of the junctions, and using the same representation format, encoding the junction as a second indexed link. Each segment is a cubic Bézier segment, a quadratic Bézier segment, a conic segment, or a line segment, each junction is a cap or a join, and the first and second indexed link includes a field whose value indicates whether a segment or a junction is encoded in a given instance.

BRIEF DESCRIPTION

Reference is now made to the following descriptions taken in conjunction with the accompanying drawings, in which.

Figure 1:
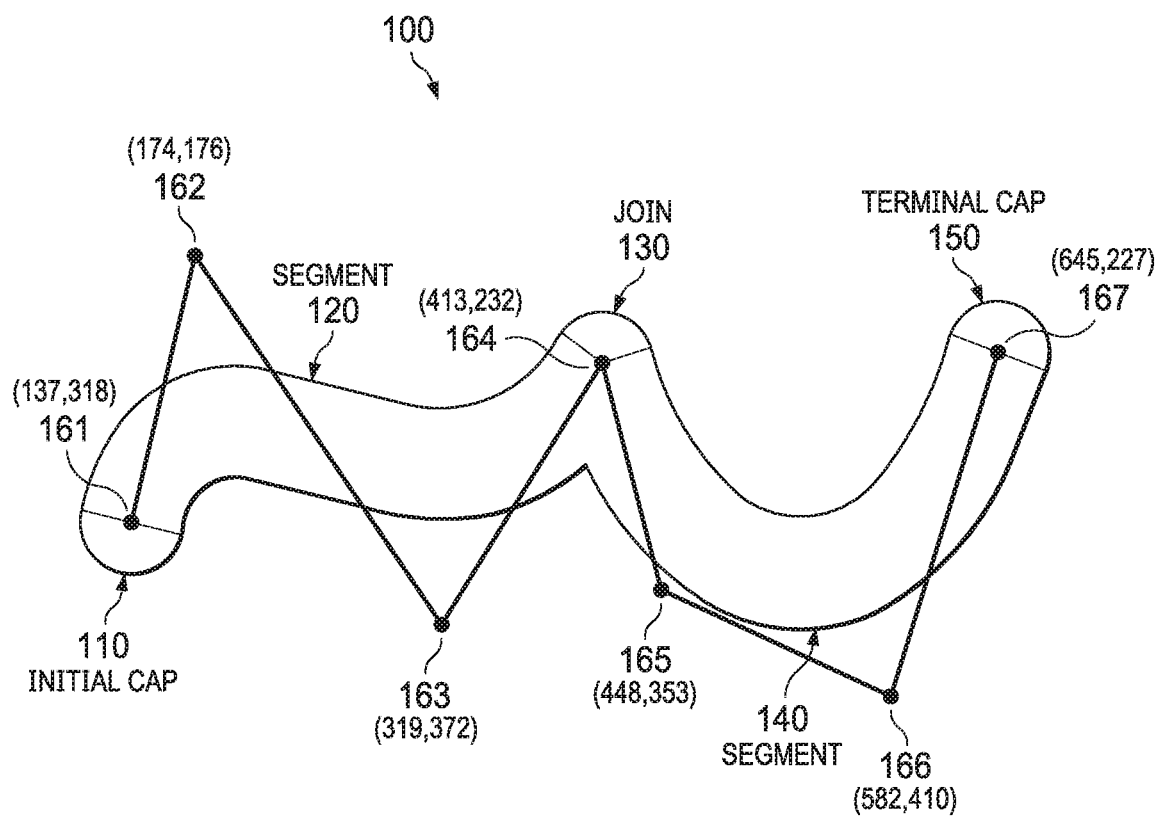
FIG. 1 illustrates a diagram of an example of a path having at least one segment and at least one junction that can be encoded according to the principles of the disclosure.
Figure 16:
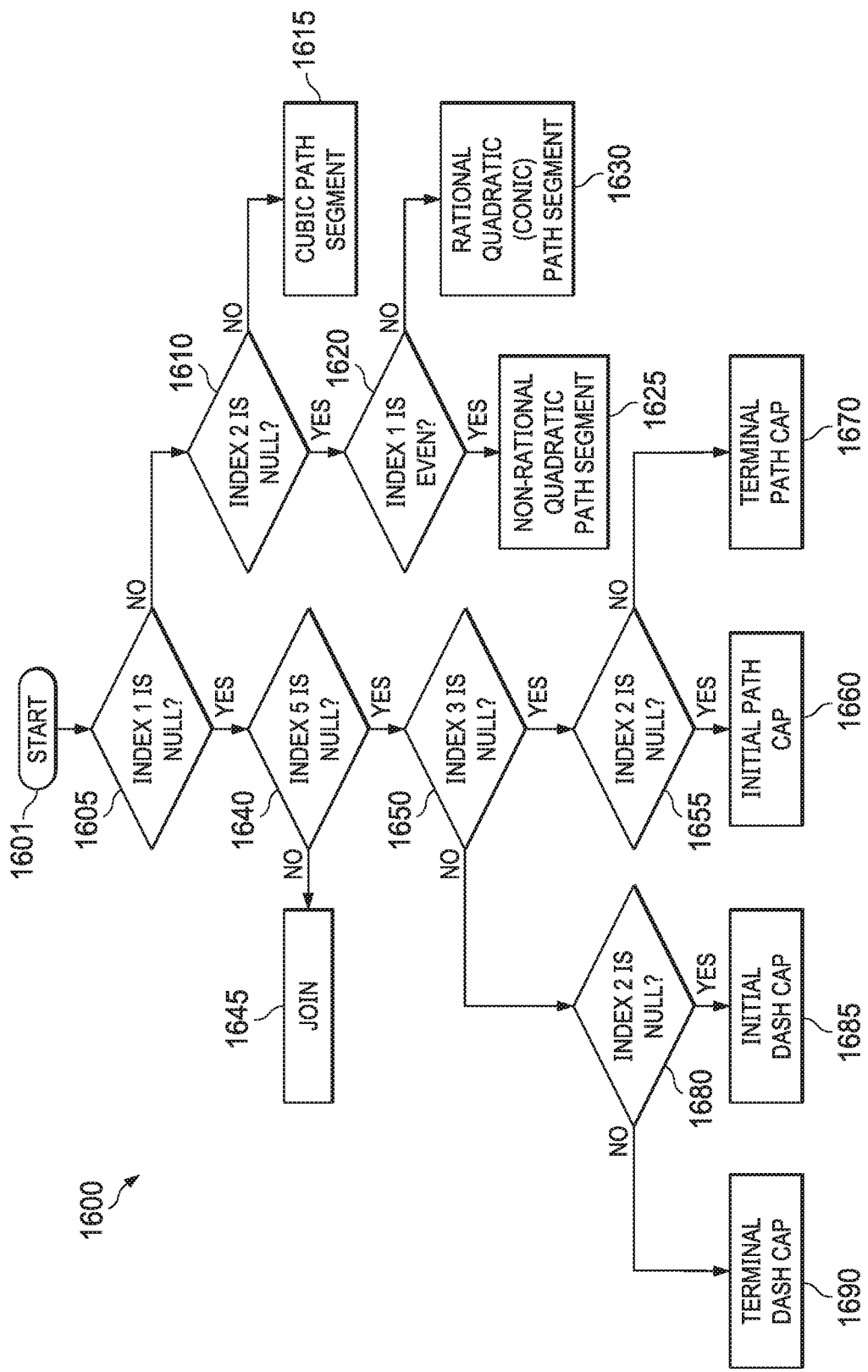
Figure 17:
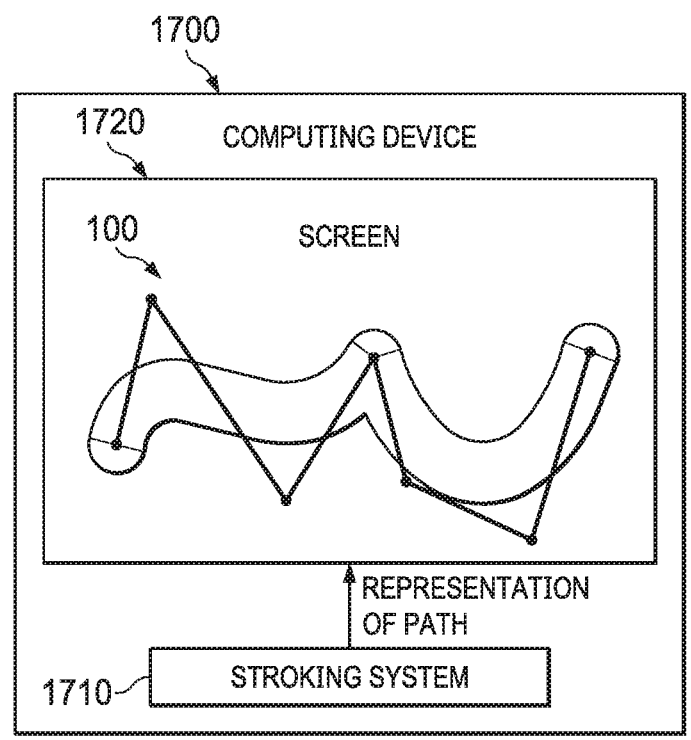
Figure 18:
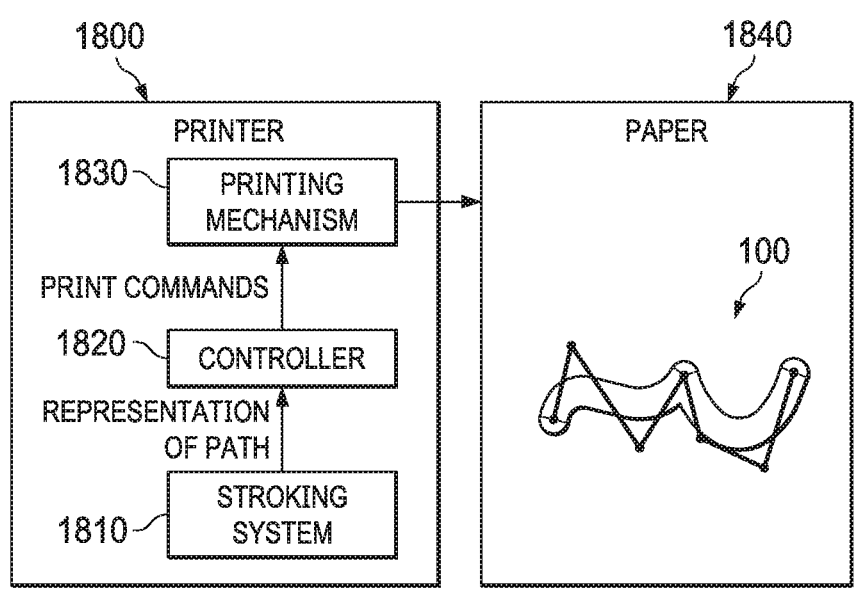

FIGS. 6, 7, 8, and 9 illustrate examples of path segments and their indexed link encoding constructed according to the principles of the disclosure;

FIGS. 10 to 14 illustrate the path from FIG. 1 and examples of encoding the different links of the path according to the principles of the disclosure;

FIG. 15 illustrates an example of an encoding of the complete path of FIG. 1 constructed according to the principles of the disclosure;

FIG. 16 illustrates a flow diagram of an example of determining a link type from an indexed link carried out according to the principles of the disclosure;

FIG. 17 illustrates a block diagram of an example of a computing device configured to display a path employing stroking according to the principles of the disclosure; and FIG. 18 illustrates a block diagram of an example of a printer configured to print a path employing stroking according to the principles of the disclosure.

DETAILED DESCRIPTION

The disclosure provides an improvement for encoding paths that unifies path segments and path junctions. The disclosure employs indexed link encoding to provide a unified compact representation for both path segments and path junctions. The compact representations are well-suited for GPU access and GPU tessellation using, for example, mesh shaders. The compact representations are data structures with a memory-efficient encoding that employs indexing to de-duplicate redundant control points of a path. The data structures can be quickly constructed using positional information of the segments and junctions without recursive processing. Additionally, the data structures can defer mapping from positional cap and join type to geometric cap and join type until rendering. Accordingly, flexible rendering is provided where the processing to change the stroke width, cap style, or join style is relatively inexpensive.

A path as used herein is a sequence of zero or more path components that are referred to herein as links. A link of a path is specified by an ordered collection of control points and can be either a path segment or path junction. A path segment is a link that specifies a stroked path segment from its first to its last control point. A path junction is a link that either connects two segments in sequence or otherwise initiates or terminates a path segment where not connected to any segment. A connecting junction is a link that connects two path segments. A non-connecting junction is a link for a segment that connects to no other segment. A connecting junction is also referred to as a join; a non-connecting junction is also referred to as a cap.

Links advantageously provide a unified way to process the segments, caps, and joins that is also well-suited to parallel processing, such as by a GPU. As noted above, a link has control points and a generating curve, also referred to herein as a generating equation, is a parametric curve specified by the link's control points. A control point is a definite two dimensional (2D) position, specified as an (x, y) 2D coordinate pair or (x, y, w) rational 2D coordinate triple that is used for conic (rational) Bézier path segments. There are two types of control points, an interpolating control point and an extrapolating control point. An interpolating control point is a control point that a segment or junction includes, and an extrapolating control point is a control point that establishes a gradient direction for a segment or junction.

A path can include various arrangements of the different links connected together. One example is a closed link sequence that is a sequence of connected segments where the initial link's initial control point and the terminal link's terminal control point are co-located and share a connecting junction. As such, a closed link sequence lacks path caps. An open link sequence is another example that is a sequence of connected segments where the initial segment link's initial control point and the terminal segment link's terminal control point do not share a connecting junction. A closed loop sequence is also called a contour and an open link sequence is also called a trajectory. Unlike a closed link sequence, an open link sequence has path caps. A path cap is a non-connecting link that marks the start or end of a sequence of connected links of a path. More specifically, an initial path cap is a link that begins an open sequence of connected segments and a terminal path cap is a link that ends an open link sequence of connected segments.

The disclosure provides a method and system for encoding paths that uniformly encodes links regardless if the links are segments or junctions. The disclosed link encoding uses the same data structure, i.e., a link structure, for the encoding of segments and junctions of paths. The data structure includes the necessary positional information of links in a compact format that allows efficient decoding for stroking. The positional information can be coordinate values of the links or references to the coordinate values. In addition to being compact, the data structure is also constructed to feed a GPU's efficient parallel tessellation (and then rasterization) process. GPUs are designed to efficiently process indexed vertex data and, accordingly, can efficiently process the disclosed compact data structures.

The data structure to compactly encode a path can be an array of indexed links that specifies control points for each of the links by control point indices into a control point coordinate array of the path. A control point coordinate array is an array that includes the control point coordinates of the encoded path. Each indexed link is a data structure corresponding to an individual link that specifies control points for its link as control point indices into the control point coordinate array of the encoded path. An index value, referred to as a null index value, is a special index value designated for indicating an unnecessary control point. The null index value can be zero. The position of one or more null index values within an indexed link encodes the link's type. The control point coordinate array includes at least one null value and the indexed link indicates a link type based on the presence or absence of one or more null index values that correspond to null values.

As noted above, the data structure can be compact. For example, an indexed link can have 8-bit or 16-bit indices for representing shared interpolating control points that are "shared" by one or two segments or junctions. As such, the encoded representation of links and the paths they form can be stored without requiring a large amount of memory. The indices in an indexed link can be as small as six unsigned bytes (capable of handling any path with 255 or fewer control points). In practice, this amount of control points is sufficient for a majority of paths for glyphs, simple logos, rounded rectangles, and other basic shapes. When a control point is typically two 32-bit floating-point values (8 bytes), the small link size of six bytes is smaller than a single control point. For paths having more than 255 control points, 16 bit indices, or even 32-bit indices, can be used and still maintain a compact structure.

Indexing as disclosed herein also permits storing a control point once and indexing it several times. Considering the standard case of a path being a sequence of connecting Cubic Bézier segments, there can be three new control points per cubic segment (24=3*8 bytes) because each segment "shares" its initial control point with the prior segment's terminal control point. Also the connecting junction (the join) between each pair of connected path segments needs no extra control points but can index control points from the two path segments it is joining. Such compactness is beneficial when drawing detailed figures, such as an entire city map of streets, particularly when there are sewer lines, gas lines, electronic lines, etc., that are present. Another example of a complicated figure is a printed circuit board (PCB) or chip layout.

Another advantage due to the compact data structure is that a control point coordinate array is often going to be floating-point x and y values (four bytes per coordinate, eight bytes per point), but could also be 16-bit signed integer values (2 bytes per coordinate, 4 bytes per point). Accordingly, the size of control point coordinate arrays can be halved. Additionally, paths encoded with control points as 16-bit integers can be transformed as part of the rendering (tessellation & rasterization) process to stretch/translate/project paths into any alternate coordinate space. Advantageously, glyphs in the standard TrueType font file format are stored as 16-bit signed integer values allowing a match for path rendering of fonts. In some examples, 8-bit coordinates can be stored if needed for various formats.

The stroked path tessellation process also demonstrates the compactness advantage of the disclosed data structures. For example, in the stroked path tessellation process a sequence of quadrilaterals are generated. For curved links, a link might be tessellated into many dozens or hundreds of quadrilaterals. Storing the tessellation would require more memory than storing a data structure that generates it, such as an indexed link. This is true even if line segments are stored with joins between each connected segments. A quadrilateral per line segment would still need to be stored. This means storing four 2D points compared to just one since each line segment essentially just adds one new control point. Joins would also have to be handled which requires additional control points; especially for a round join.

As noted above, the data structure allows efficient decoding for stroking. The stoking can be polar stroking that employs stepping in tangent angles along links of a path, both segments and junctions, to provide a polar stroked representation of the path. Stepping in tangent angles along a path involves "solving" to determine when a link might change from turning clockwise to counter-clockwise (or vice versa) and then at every step, solving for when a gradient of the link is orthogonal to a 90 degree rotation of each tangent angle step. This approach can employ trigonometric functions and solving a line-curve intersection at every step along a path.

The polar stroked representations can be used to generate stroked tessellations of paths. For example, the polar stroked representation of a link can be a sequence of polygons, such as quadrilaterals, that represent the link, and can be used to generate a stroked tessellation. For existing methods that employ a CPU for generating a stroked tessellation, stepping in tangent angles would be an expensive approach. The efficient trigonometric function evaluation (sin, cos, a tan 2) of parallel processors, such as a GPU, makes the solving steps of stepping in tangent angles entirely viable. For example, since the polar stroking method determines how many steps to take without a recursive process, the polar stroking method maps well to GPU tessellation and mesh shaders. The entire polar stroking method (e.g., tessellation, rasterization, and shading) can be performed by a GPU.

The disclosed polar stroking can be employed to improve the performance and quality of stroked path rendering in several different areas including web browsers (Scalable Vector Graphics (SVG)), document viewers (PDF), navigation and mapping systems, and illustration applications (Adobe Illustrator, Inkscape). Polar stroking can also be used to control different machines that perform an operation according to an input path. For example, a Computer Numerical Control (CNC) machine that processes a material according to an input path. Polar stroking is also beneficial where the stroke expansion happens in a different coordinate space from the path itself. A typical use for this is window-space stroking (known as non-scaling-stroke in SVG). This is advantageous for applications such as the maps and navigation systems where the stroking is specified with a width in pixels (typically one) so that when zooming into the map the width of grid lines or markings do not zoom too. As with the disclosed encoding, the polar stroking method can also process each link of a path without making special arrangements for different types of links.

Turning now to the figures, FIG. 1 illustrates a diagram of an example of a path 100 having at least one segment and at least one junction that can be encoded according to the principles of the disclosure. The path 100 includes an initial cap 110, a first Cubic Bézier segment 120, a join 130, a second Cubic Bézier segment 140, and a terminal cap 150. The initial cap 110 and the terminal cap 150 are examples of non-connecting junctions and the join 130 is an example of a connecting junction. The initial cap 110 and the terminal cap 150 are examples of rounded caps. Other types of caps, such as, a rectangular cap, a triangular cap or even no cap, can be similarly encoded. The join 130 is an example of a rounded join. Other types of joins, such as, bevel, triangular, miter, truncated miter, and reverted miter, can be similarly encoded.

Control points 161 to 167 for the path 100 are also illustrated. Control points 161, 164, and 167 are interpolating control points that are shared between different links. Control point 161 is shared between initial cap 110 and first Cubic Bézier segment 120, control point 164 is shared between Cubic Bézier segment 120, join 130, and second Cubic Bézier segment 140, and control point 167 is shared between second Cubic Bézier segment 140 and terminal cap 150. Advantageously, the shared control points can be indexed multiple times in the data structure and reduce the amount of storage capacity needed. Control points 162, 163, 165, and 166, are all extrapolating control points.

Figure 2:
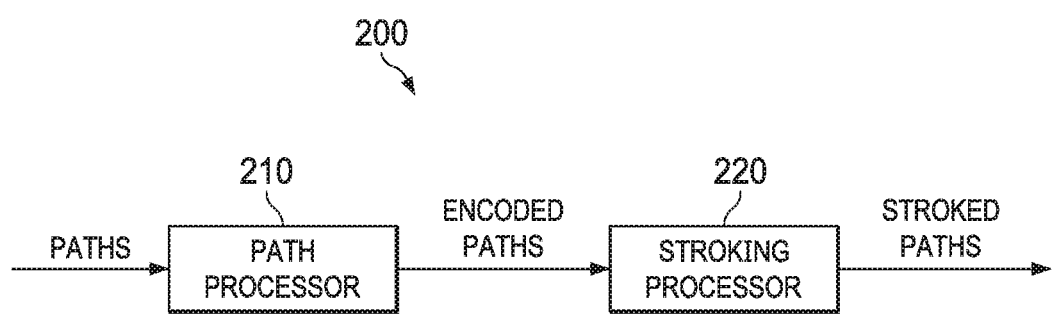
FIG. 2 illustrates a block diagram of an example of a stroking system constructed to encode paths according to the principles of the disclosure.

The coordinate values of the control points 161 to 167 for the links are also illustrated in FIG. 1 as x, y coordinates. FIGS. 10 to 14 illustrate the different links of the path 100 and an example of a corresponding control point coordinate array for the path 100 that includes the coordinate values. FIGS. 10 to 14 also includes an example of a data structure, an indexed link, which is used to encode each of the different links. The path 100 can be provided to a stroking system, such as illustrated in FIG. 2, for generating a stroked representation of the path. The stroking system can be a polar stroking system that operates according to the method 500 of FIG. 5.

FIG. 2 illustrates a block diagram of an example of a stroking system 200 constructed that encode paths according to the principles of the disclosure. The stroking system 200 can be, or be part of, a renderer that draws stroked tessellations of the paths. The stroking system 200 can be a polar stroking system that employs the encoded paths for stroking. The stroking system 200 can be located on a single computing device or distributed over multiple computing devices. The computing devices can be, for example, a laptop, a desktop, a computing pad, a smart phone, or a server. The computing devices can include at least one screen for displaying the paths. The computing devices can also be a machine or used to control a machine. For example, the stroking system 200 can be associated with or integrated with a machine, such as a printer that prints the paths or a CNC machine that processes a material using the paths. In some examples, the stroking system 200 is part of a cloud-based server that can be used for cloud-based rendering and can also be used for game streaming. Game streaming allows a user to control and play a game that is rendered remotely from their input device, such as a keyboard, a game controller (including virtual reality input controller), and a mouse. The cloud-based rendering platform and game streaming can allow users to remotely compete against others in a video game over a communications network. The stroking system 200 includes a path processor 210 and a stroking processor 220. The stroking system 200 can include more than one path processor 210 or more than one stroking processor 220. The path processor 210 can be a central processing unit (CPU) or a graphics processing unit (GPU). In one example, the path processor 210 is a CPU and the stroking processor 220 is a GPU. Advantageously, a GPU can include multiple parallel processors to allow processing of multiple links in parallel. In some examples, the path processor 210 and the stroking processor 220 can be a single processor.

The stroking system 200 is configured to receive paths to be represented and generate an encoded path representation. The received paths can be in the form of code representing the generating equations for the links of the path, such as SVG path commands. The generating equation for each link includes the control points for that link. The paths can be from, for example, a web browser, a document viewer, a navigation or mapping system, or an illustration application, such as a vector graphics program. A received path can be simple, such as path 100 of FIG. 1, or complex with multiple types of segments and junctions sequenced together in multiple combinations.

The path processor 210 is configured to decompose received paths into links, such as the segments, caps, and joins of path 100, and encode the links for storage using the same data structure for each of the links. The data structure can be an indexed link as disclosed herein. For example, the path processor 210 can receive path 100 and decompose path 100 to the various segments, caps, and joins illustrated in FIG. 1 and encode the segments, caps, and joins for storage. The encoded links can be stored in a memory of the stroking processor 220. As such, the path processor 210 encodes the links into a format that can be stored and read by the stroking processor 220. The encoded links and control points of the links are downloaded to the stroking processor 220 for representing the path 100. The path processor 210 can be configured to perform additional processing of the links to enable stroking before instructing the stroking processor 220 to generate the stroked representations of the links. The additional processing can correspond to the processing performed by CPU 310 of FIG. 3.

At this point, the path processor 210 sends commands to the stroking processor 220 instructing the stroking processor 220 to generate the stroked representations of the path links. The stroked representations can be polar stroked representations. The commands can be sent from the path processor 210 to the stroking processor 220 through a programing interface, wherein the commands appear as function calls. The links can be generated as primitives, such as patches, or can be generated as tasks. The generated polar stroked representations can be used to represent the path visually. For example, the stroking processor 220 can provide the stroked representations to computing device screens to display the path. The computing devices can be, for example, a laptop, a desktop, a computing pad, a smart phone, or another type of computing device having a screen capable of displaying the polar stroked representations. The stroking processor 220 can also provide the stroked representations for printing of the path or operating a machine employing the path. For example, the stroking system 200 can be integrated with a printer that employs the stroked representations to print the path.

The stroking processor 220 can be configured to generate the stroked representations based on the encoded path generated by the path processor 210. The stroking processor 220 can operate according to the polar stroking algorithms disclosed herein. Accordingly, the stroking processor 220 can effectively encode the algorithms that are disclosed herein, such as the algorithm represented by the flow chart of FIG. 5.

The stroking processor 220 can generate the stroked representations for links in parallel. In some examples, the stroking processor 220 can generate the stroked representa- tions for multiple paths in parallel. Thus, the stroking processor 220 can operate on multiple paths in parallel while also operating on the multiple links of those paths in parallel. In parallel as used herein includes at least partially in parallel and indicates that processing is occurring in parallel paths but not necessarily simultaneously.

The stroking processor 220 can be a GPU and operate according to a graphics pipeline where certain steps of polar stroking occur at particular stages along the graphics pipeline. The stroking processor 220 can provide stroking functionality, such as polar stroking, via a shader or shaders of the graphics pipeline. Alternatively, encoded paths could be stroked with other methods for stroking paths such as uniform parametric tessellation. Shaders are programs that perform a particular function or functions at the particular stages of the graphics pipeline. Polar stroking shaders are examples of shaders that have been programmed to perform the polar stroking functions disclosed herein. Polar stroking shaders can perform additional functions that are typically included in a graphics pipeline or can execute as part of a shader (or shaders) of a graphics pipeline. The stroking processor 220 can employ one of the different examples of a graphics pipeline such as illustrated in FIG. 3 or FIG. 4.

Figure 3:
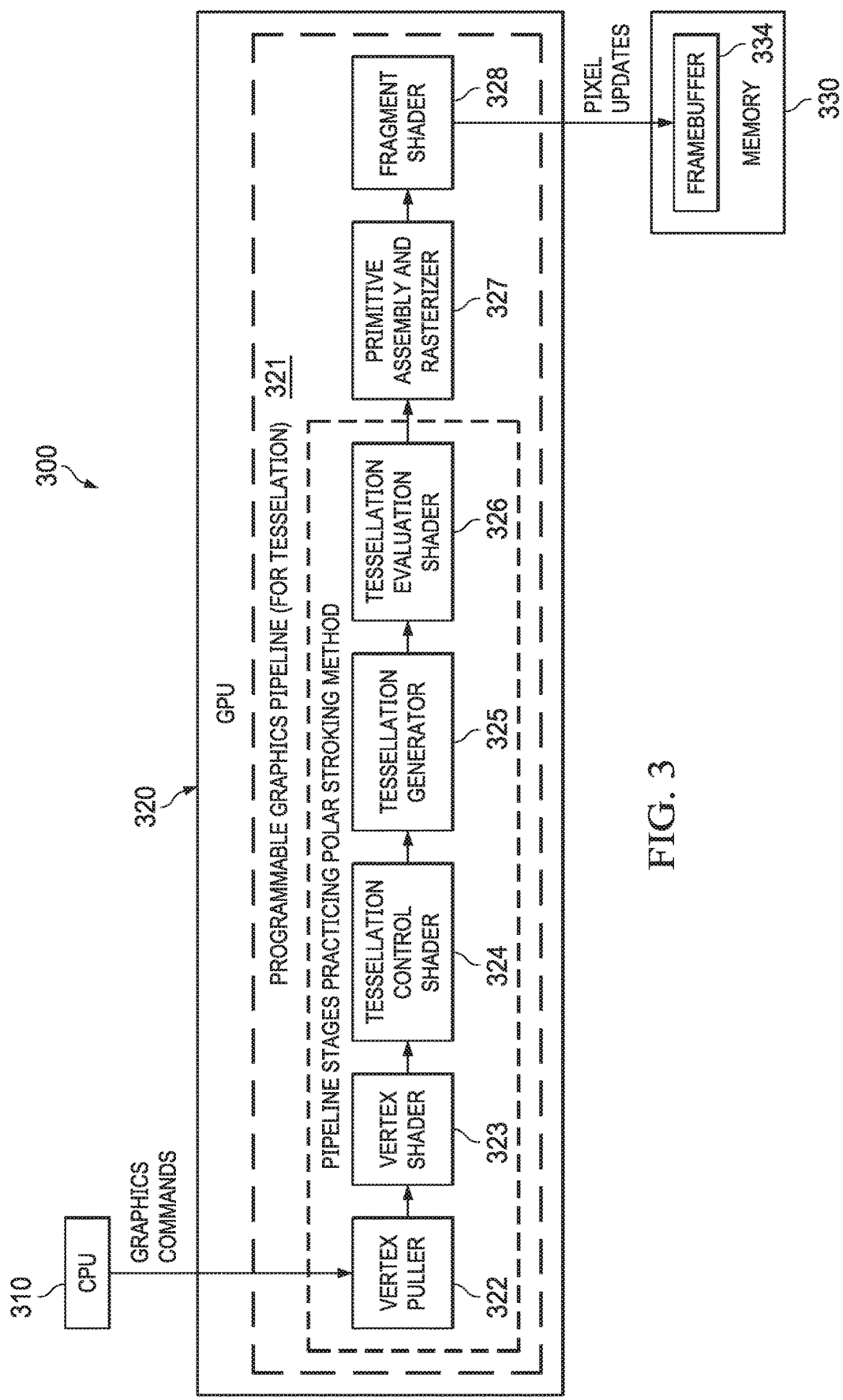
FIG. 3 illustrates a block diagram of an example of a renderer constructed to perform encoding of paths according to the principles of the disclosure.
Figure 4:
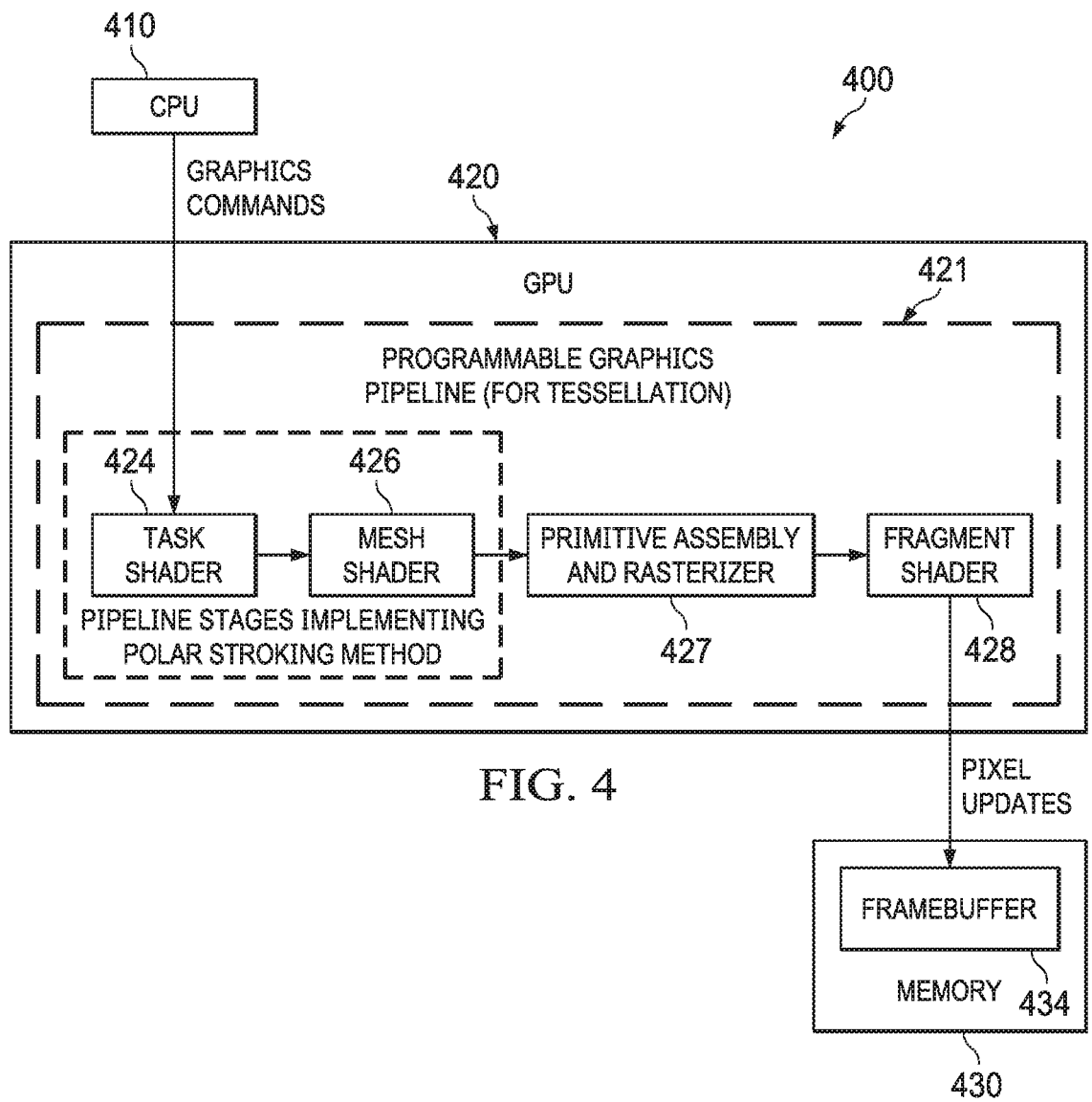
FIG. 4 illustrates a block diagram of another example of a renderer constructed to perform encoding of paths according to the principles of the disclosure.

FIG. 3 illustrates a block diagram of an example of a renderer 300 including a graphics pipeline constructed to perform polar stroking according to the principles of the disclosure. The renderer 300 provides an example of a system for polar stroking, such as the stroking system 200 of FIG. 2. The renderer 300 renders a path employing polar stroking. The renderer 300 includes a CPU 310, a GPU 320, and another hardware component, a memory 330.

The CPU 310 is configured to accept or receive a path, decompose the path to links, encode the links employing the same data structure for each link, and download the links and control points to the GPU 320 via graphic commands. The CPU 310 is further configured to bind polar stroking shaders of the GPU 320. The binding can include establishing a current configuration for polar stroking shaders and setting variables. The CPU 310 also sets uniforms for the polar stroking shaders. A uniform's value does not change during the shader processing; uniforms are constants for duration of the polar stroking process. For example, a stroke width can be set to five. Another part of configuring can include transforming the path's coordinate space by rotation, translation, scaling, or projection. At this point, the CPU 310 sends commands to the GPU 320 instructing the GPU 320 to draw the links of the path. The commands can be sent from the CPU 310 to the GPU 320 through a programing interface, wherein the commands appear as function calls. As noted above, the links can be drawn as patches or tasks. Other primitives, such as a triangle, can also be employed by a graphics pipeline for rendering.

The GPU 320 includes a programmable graphics pipeline 321 for processing primitives that represent the path. The primitive can be a patch and will be used as an example primitive for discussing the operation of the graphics pipeline 321. The graphics pipeline 321 includes a vertex puller 322, a vertex shader 323, a tessellation control shader 324, a tessellation generator 325, a tessellation evaluation shader 326, a primitive assembly and rasterizer 327, and a fragment shader 328. Some of the stages, such as the vertex puller 322, the tessellation generator 325, and the primitive assembly and rasterizer 327 are fixed-function GPU stages of the graphics pipeline 321. The other illustrated stages, the vertex shader 323, the tessellation control shader 324, the tessellation evaluation shader 326, and the fragment shader 328, are programmable shader GPU stages of the graphics pipeline 321. A GPU capable of OpenGL 4.0, OpenGL for embedded systems (ES) 3.2, Direct3D 11, or a similar graphics application programming interface provides such a programmable graphics pipeline 321 with these stages. OpenGL 4.0 and OpenGL ES 3.2 are available from The Khronos Group, Inc., based in Beaverton, Oreg., and Direct3D 11 is available from Microsoft Corporation of Redmond, Wash. A GPU available from Nvidia Corporation of Santa Clara, Calif., such as one with a Volta or Pascal architecture, is an example of a GPU that can provide the programmable graphics pipeline 321. As noted below with respect to FIG. 5, various stages of the graphics pipeline 321 can also be configured to perform steps of the polar stroking method 500.

The vertex puller 322 is the first stage of the graphics pipeline 321 that fetches vertices of the patches. The vertex shader 323 then describes the various traits of each of the vertices. The tessellation control shader 324, the tessellation generator 325, and the tessellation evaluation shader 326 cooperate to tessellate patches into a triangle mesh or connected lines. The tessellation control shader 324 and the tessellation evaluation shader 326 are two programmable stages for GPU tessellation and the tessellation generator 325 is a fixed-function GPU stage. The tessellation control shader 324 performs patch-wide computations as the first stage of GPU tessellation, such as computing a level of detail (LOD) per patch. The tessellation generator 325 uses tessellation levels to decompose a patch into a new set of primitives and assigns coordinates for each vertex. The tessellation evaluation shader 326 evaluates mesh vertices based on information provided by the tessellation control shader 324 and the tessellation generator 325. The tessellation evaluation shader 326 computes the position of each vertex from the tessellation generator 325, controls the tessellation pattern, and specifies orientation of generated patches.

In an example representation of a link intended for pipeline 321, a patch with six control points encodes each link. FIGS. 10-15 illustrate an example of an array of indexed links where each indexed link includes six control points. Six control points is enough to index the four control points of a cubic Bézier segment and two additional to index initial and terminal gradient control points. The other types of links require fewer control points. A special control point index value (for example, zero) can be used to encode the specific kind of link. A skilled practitioner will recognize such a link representation is well-suited to the vertex puller 322 and can be compactly stored in memory.

The primitive assembly and rasterizer 327 divides the resulting tessellated patch generated by tessellation evaluation shader 326 into a sequence of individual rasterization primitives (typically triangles) for rendering. The fragment shader 328 then computes color and other attributes of each pixel of the base patches. The memory 330 receives the pixel updates from the fragment shader 328 of the programmable graphics pipeline 321. The memory 330 includes a framebuffer 334 that stores the received pixel updates, which provides an image for display. In this example, the image is the stroked tessellation for the path. In some examples the memory 330 is a video memory wherein a series of stroked tessellations are encoded into a video stream.

Crucial details to coax a tessellation appropriate for path stroking from the programmable graphics pipeline 321 are not obvious. The tessellation generator 325 typically generates a dense rectangular 2D mesh with the width and height of the mesh limited to 64 on a side. The tessellation of a stroked path segment, cap, or join often needs to be tessellated into a long strip of quadrilaterals (sometimes 100 s long) rather than a dense mesh. To tessellate accurately a link needing considerable tessellation, the tessellated strip may need to be many times longer than either the maximum width or height (typically 64 for either) of the dense mesh that tessellation generator 325 can generate. A non-obvious technique, herein called NaN poisoning (as Not-A-Number, or NaN, is an invalid floating-point value), carves the dense mesh into the appropriate (possibly very long) strip for stroking an arbitrary link. In an example usage for the programmable graphics pipeline 321, the polar stroking shader executing on the tessellation evaluation shader 326 generates NaN values for the position of vertices of triangles intended to be discarded. The primitive assembly and rasterizer 327 cannot process rasterize primitives with one or more NaN position values and so must discard any such "NaN-poisoned" primitives. The remaining triangles not discarded have their (NaN-free) vertex positions computed by tessellation evaluation shader 326 so the triangles seam together into a long strip when processed by primitive assembly and rasterizer 327 to form a continuous strip of triangles corresponding to the intended stroked tessellation. Orchestrating the NaN-poisoning and strip seaming involves the polar stroking shader operating on tessellation control shader 324 to feed the appropriate mesh and associated parameters to tessellation generator 325 and tessellation evaluation shader 326.

FIG. 4 illustrates a block diagram of another example of a renderer 400 including a graphics pipeline constructed to perform polar stroking according to the principles of the disclosure. The renderer 400 provides another example of a system for polar stroking. The renderer 400 includes a CPU 410, a GPU 420, and a memory 430. The GPU 420 includes a graphics pipeline 421 that similarly provides a stroked tessellation of a link as does the graphics pipeline 321 of the GPU 320 in FIG. 3. The GPU tessellation of the graphics pipeline 421, however, is provided by two programmable stages, a task shader 424 and a mesh shader 426, instead of the tessellation control shader 324, the tessellation generator 325, and the tessellation evaluation shader 326, of the graphics pipeline 321. The other components of the graphics pipeline 421 and the renderer 400 can be configured as and operate as the same named components of the graphics pipeline 321 and the renderer 300 of FIG. 3. As such, the fragment shader 428 is another programmable shader GPU stage and the primitive assembly and rasterizer 427 is a fixed-function GPU stage. A GPU available from Nvidia Corporation, such as one that has a Turing architecture, is an example of a GPU that can be employed for the programmable graphics pipeline 421. The path processor 210 of FIG. 2 can operate as the CPU 310 of FIG. 3 and the CPU 410 of FIG. 4. While the graphics pipeline 321 operates on a patch representing each link, the graphics pipeline 421 operates on tasks that may represent one or more links and furthermore spawn mesh shader instances to generate the necessary tessellation.

The task shader 424 is programmed to perform the functions of the vertex shader 323 and the tessellation control shader 324 of FIG. 3. As such, the task shader 424 determines the various traits of each of the vertices of its one or more links and reads the vertex data itself, unlike FIG. 3 where the vertices are pulled by a fixed-function vertex puller 322. Then task shader 424 performs patch-wide computations as the first stage of GPU tessellation, similar to tessellation control shader 324.

The mesh shader 426 is configured to perform the remaining GPU tessellation functions that include decomposing one or more links via polar stroking into a new set of primitives, assigning coordinates for each vertex, and evaluating mesh vertices. The mesh shader 426 is further configured to compute the position of each vertex and control the tessellation pattern of an output mesh. The primitive assembly and rasterizer 427 then divides the resulting meshes into a sequence of individual triangles for rendering and the fragment shader 428 computes color and other attributes of each pixel of the base links. Pixel updates are then provided to framebuffer 434 of memory 430 to be used to display the stroked tessellation of the path. As noted below with respect to FIG. 5, the task shader 424 and the mesh shader 426 can also be configured to perform steps of the polar stroking method 500.

Figure 5:
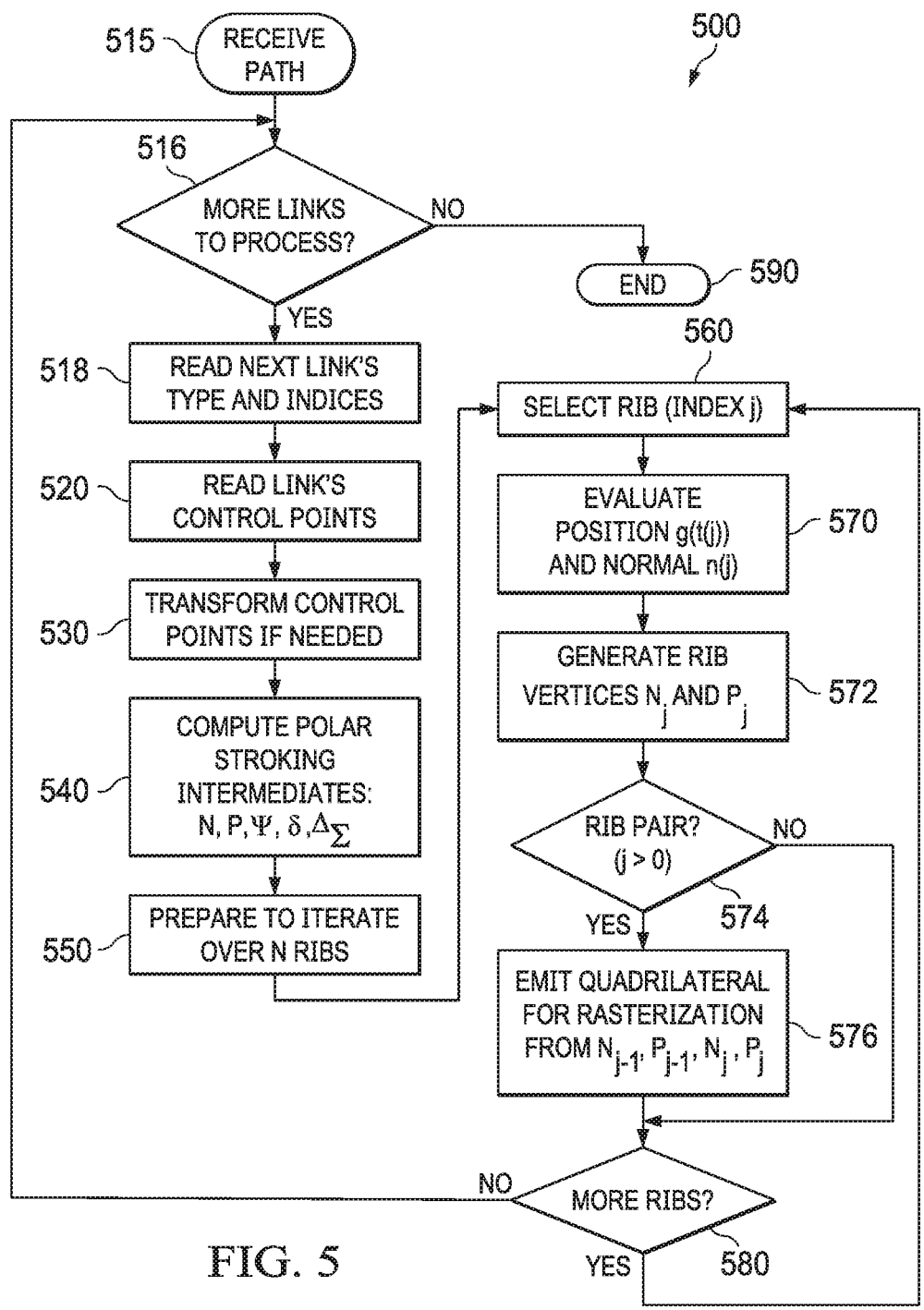
FIG. 5 illustrates a flow diagram of an example of a method of polar stroking using encoded paths constructed according to the principles of the disclosure.

FIG. 5 illustrates a flow diagram of an example of a polar stroking method 500 for generating a polar stroked representation employing encoded paths as disclosed herein. The polar stroked representation can be used for stroked tessellation. As such, some of the steps of method 500 can map to a GPU such as GPU 320 or GPU 420. As denoted below, different stages of the programmable graphics pipelines 321 and 421 can be configured to perform at least some of the steps or particular functions of the polar stroking method 500. At least some of the steps of method 500 can also be performed by the stroking system 200 of FIG. 2.

The method 500 includes essentially two steps: determining polar stroking intermediates for each link of the path and employing the polar stroking intermediates to evaluate polygons that are used to generate a polar stroked representation of each link. For the method 500, quadrilaterals will be used as an example polygon. The method 500 begins in a step 515 with a path that is received. The path can be a pre-processed path, such as a path received from the path processor 210 of FIG. 2.

The method 500 proceeds to a step 516 where a determination is made if there is a link of the path to process. The link can be either a segment or a junction. The number of links and the type of links will vary depending on the path. For the initial run of the method 500, there will be at least one link of the path to process. When there are no additional links of the path to process, the method 500 continues to step 590 and ends.

When there is a link (i.e., an initial link or a next link) of the path to process, the method 500 continues to step 518 where the type and indices of the link are read. The type and indices of the links can be read from the indexed links that represent the path. The type of link can be a segment, cap, or join, such as represented by the links of the path 100. For example, the link can be an initial cap, a terminating cap, or a join, such as a miter join or a bevel join. The indices of the link indicate the start and end of the link.

In a step 520, the control points of the link are read. The control points can be determined from the indexed link of each link that indexes to the coordinate control point array of the path. As noted above, each link has a generating equation that includes control points that define the link. For the method 500, characterization of the link includes the link type, indices, generating equation, and the control points. With respect to the programmable graphics pipeline 321, steps 518 and 520 can be performed by the vertex puller 322.

In some situations such as window-space stroking, the control points are also transformed in step 530 as needed. Transforming control points accounts for any rotation, translation, scaling, or perspective transformation intended for the polar stroked representation of the path. With respect to the programmable graphics pipeline 321, step 530 can be performed by the vertex shader 323 and below step 540 can be performed by the tessellation control shader 324.

In step 540, polar stroking intermediates for the link are computed. The polar stroking intermediates can be computed from the control points employing arc tangents. The polar stroking intermediates include N, p, $\Psi$, $\delta$, $\Delta_\Sigma$. N is the number of quadrilaterals that will need for the polar stroked representation of the link. p is an ordered sequence of parametric values t that defines the link. The first p is always zero and the last p of the sequence is always one. Each intermediate p between the first and the last p are where the inflection points of the link are located. An inflection point is where a link changes the direction of bending. The number of inflection points can vary depending on the type of link. A cubic Bézier curve, for example, can have up to two inflection points.

$\Psi$ is the tangent angle corresponding to each element p of the ordered sequence. For the first p, $\Psi$ indicates the angle in which the link is heading initially. For the last p, $\Psi$ indicates the angle at which the link terminates. For each intermediate p, $\Psi$ indicates the tangent angle of its corresponding inflection.

$\delta$ is the number of degrees to step by along the different intervals of the link between inflections, and $\Delta_\Sigma$ is the cumulative number of integer steps to take along each interval of the link. N, p, $\Psi$, $\delta$, $\Delta_\Sigma$ are arbitrary notations that are used to denote characteristics of a link that are employable for polar stroking. One skilled in the art of differential geometry could compute these polar stroking intermediate values. For example, the hodograph curve of the generating equation for the link can be used to determine at least some of the polar stroking intermediate values.

Once the polar stroking intermediates are obtained, they are used to determine the quadrilaterals. Determining the quadrilaterals is an iterative process that starts in a step 550 and continues to a step 560 by selecting a rib. A rib is one side of a quadrilateral having a length that is equal to the stroke width of the path. A pair of sequential ribs can form a quadrilateral. For an initial rib of a rib pair, an index value can be set to zero. The position and normal for the rib are evaluated in a step 570 and the vertices for the rib are generated in a step 572. With respect to the programmable graphics pipeline 321, steps 550 and 560 can be performed by the tessellation generator 325, and steps 570 and 572 can be performed by the tessellation evaluation shader 326. Each of the ribs is independent and can be processed in parallel.

In a step 574, a determination is made if a pair of ribs has been evaluated. For the initial rib, the determination can be if more than one rib for the link has been selected. As illustrated in FIG. 5, the determination can be made by comparing the current index value of the selected rib to zero. If a pair of ribs has not been evaluated, the method 500 continues to step 580 where a determination is made if there are more ribs to process for the link. When there are no other ribs of the link to process, the method 500 continues to step 590 and ends. For the first pass through the iterative rib process, there will be another rib to process. When there is at least one more rib to process, the method 500 returns to step 560 and the next rib is selected. At this point, the index can be increased by one for the next rib. The position and normal for the next rib are evaluated in step 570 and the vertices for the next rib are generated in step 572. A determination is then made if a pair of ribs has been evaluated in step 574. If not, the method 500 continues to step 580. If so, a quadrilateral for rasterization is generated in step 576. The quadrilateral is defined by the vertices of the pair of ribs. The quadrilateral can be provided to a rasterizer, such as the primitive assembly and rasterizer 327 or 427 of FIGS. 3-4. Alternatively, the quadrilateral could be split and represented as two triangles sharing a common edge. From step 576, the method 500 continues to step 580 and proceeds. The index for the ribs can be reset to zero in, for example, steps 576 or 580, for further indication of rib pairs in the iterative process. Other counters or comparison values can also be used to determine rib pairs. For example, a mesh shader approach as in FIG. 4 may generate rib pairs to match the thread parallelism of mesh shader instances.

The steps of generating vertices for ribs and then generating the quadrilaterals are repeated for each rib of the link. When there are no more ribs of the link as determined in step 580, the method 500 continues to step 516 where a determination is made if there is another link of the path to process. If there are no more links of the path, then the method 500 continues to step 590 and ends. All the generated quadrilaterals for the links of the path can then be used to, for example, render the path as a stroked tessellation. If there are more links to process, the method 500 continues to step 518 for the next link. As noted above, different stages of the programmable graphics pipeline 321 can be configured to perform designated steps of the method 500. With respect to the programmable graphics pipeline 421, the task shader 424 can be configured to perform steps 518 to 550, and the mesh shader 426 can be configured to perform steps 560, 570, 572, 574, and 576.

While presented as an iterative process, all the rib iterations can operate independently so at least portions of the method 500 can be performed in parallel, such as on a GPU. Multiple processing sets of ribs can be evaluated in parallel and multiple processing sets of links can be processed in parallel employing a GPU or GPUs. In one example, a sequence of 32 ribs is evaluated in parallel; furthermore, several such sequences up to 32 ribs can be simultaneously evaluated in parallel. In some examples, ribs from eight links are processed simultaneously.

As noted above, the method 500 can also be used to generate caps and joins. Caps in vector graphics systems can be round, square, triangular, or omitted. In polar stroking, a cap is handled as a degenerate link where the control points are all co-located at the cap's anchor point. The polar stroking intermediates N, p, $\Psi$, $\delta$, $\Delta_\Sigma$ can be computed such that the geometry of the cap can be generated with the same rib iteration procedure applied to curved segments. Caps are complicated by distinguishing "inside" and "outside" radii with the inside radius typically forced to zero for a cap. Square caps are further complicated by scaling the outside radius of the ribs at the corners of a square cap by the square root of two (1.414 . . . ). Augmenting the rib processing for these complications due to caps is straightforward and imposes minimal overhead on rib processing for non-cap links.

Similarly, joins in vector graphics systems can be round, beveled, mitered, triangular, or omitted. In polar stroking, a join is handled as a degenerate link where the control points are all co-located at the join's junction point. The polar stroking intermediates N, p, $\Psi$, $\delta$, $\Delta_\Sigma$ can be computed such that the geometry of the cap can be generated with the same rib iteration procedure applied to curved segments. As with caps, joins are complicated by distinguishing "inside" and "outside" radii with the inside radius typically forced to zero for a join. Mitered joins are further complicated by computing the miter point of such joins and either truncating the miter or reverting to a bevel join if the miter point would exceed the path's specified miter limit depending on the miter join style. Augmenting the rib processing for these complications due to joins is straightforward and imposes minimal overhead on rib processing for non-join links.

Various examples of path segments are illustrated in FIGS. 6-9 to show the representation of path segments as a data structure that refers to a control point coordinate array of the particular segments and is used to encode each of the different segments. In FIGS. 6 to 9, the control point coordinate arrays include a combination of null values and coordinate values of the control points of the segments. Each of the example data structures of FIGS. 6 to 9 is an indexed link. The indexed links in FIGS. 6 to 9 have six coordinate indices that are designated as indices 0 through 5, wherein four of the six indices are designated for position control points of the different path segments and two are designated for gradient control points of the different path segments. The position control point indices refer to the coordinate values of the path segment in the control point coordinate array and the gradient control point indices specifically refer to the coordinate values of the gradient control points of the path segment. The type of each link is encoded compactly using the null values as subsequently disclosed in FIG. 16 so the path segment data structure advantageously needs no additional data beyond its indices.

Figure 6:
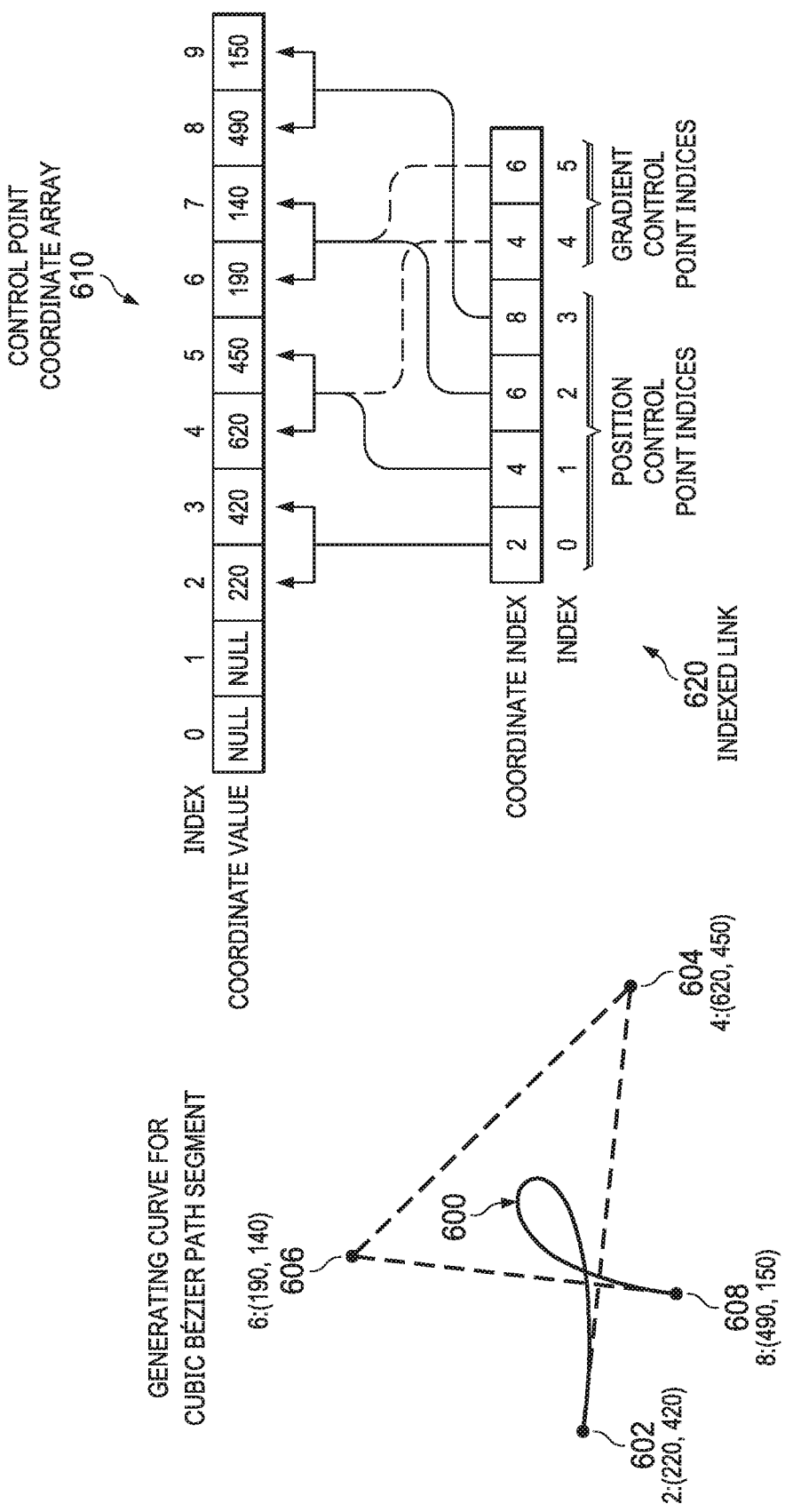

FIG. 6 illustrates a cubic Bézier segment 600, a corresponding control point coordinate array 610, and indexed link 620. The cubic Bézier segment 600 includes four control points, denoted as first control point 602, second control point 604, third control point 606, and fifth control point 608, which each have coordinate values that are stored in the control point coordinate array 610. Control point coordinate array 610 has ten index slots, or indices, that include the coordinate values of the first, second, third, and fourth control points 602, 604, 606, and 608 in indices 2 through 9 and null values in indices 0 to 1. Position control point indices 0 through 3 of the indexed link 620 refer to indices 2, 4, 6, and 8 of the control point coordinate array 610. Gradient control point indices 4 to 5 of the indexed link 620 refer to indices 4 and 6 of the control point coordinate array 610, which are the coordinate values of the gradient control points of the cubic Bézier segment 600.

Figure 7:
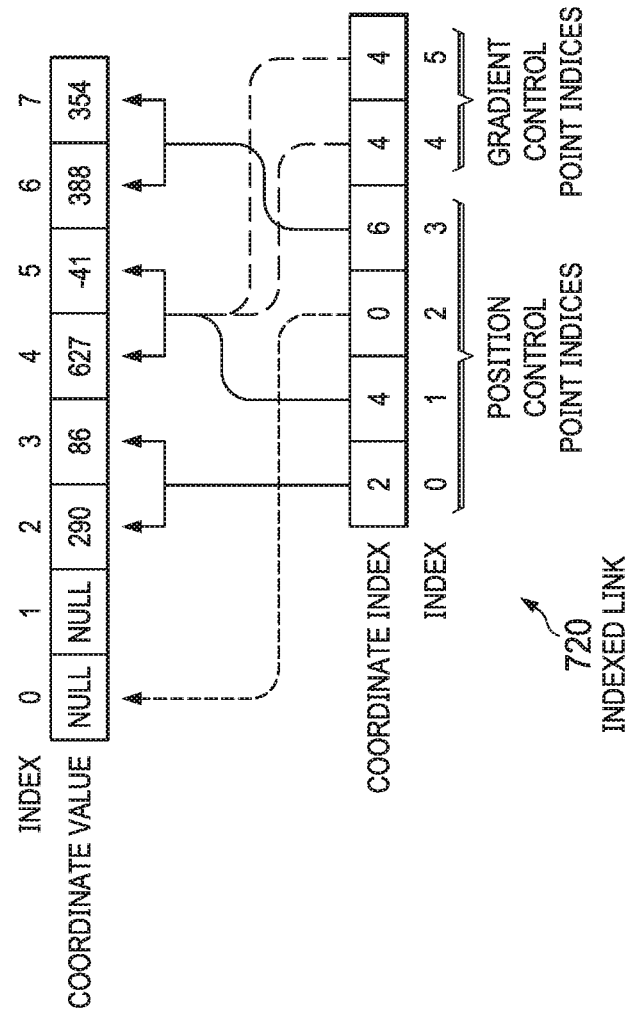
Figure 7:
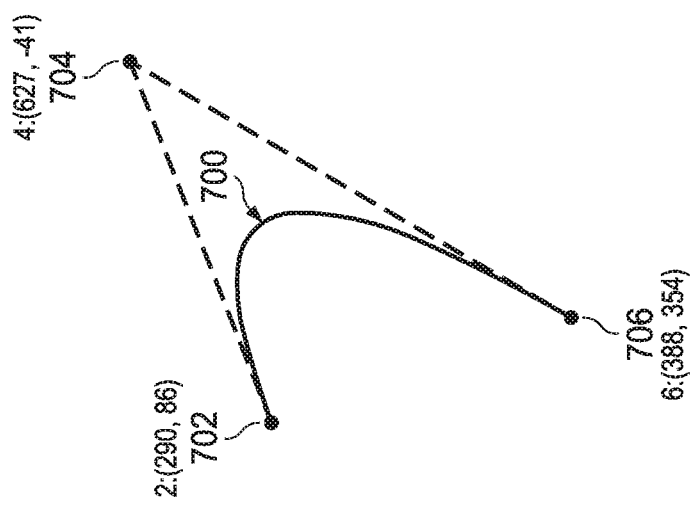

FIG. 7 illustrates a (non-rational) Quadratic Bézier segment 700, a corresponding control point coordinate array 710, and indexed link 720. The (non-rational) Quadratic Bézier segment 700 includes three control points, denoted as first control point 702, second control point 704, and third control point 706, which each have coordinate values that are stored in the control point coordinate array 710. Control point coordinate array 710 has eight indices that include the coordinate values of the first, second, and third control points 702, 704, and 706 in indices 2 through 7 and null values in indices 0 to 1. Position control point indices 0 through 3 of the indexed link 720 refer to indices 2, 4, 0 (null), and 6 of the control point coordinate array 710. Position control point index 2 pointing to the 0 (null) index value in control point coordinate array 7120 encodes that this segment is a quadratic, rather than cubic, and reflects the fact that quadratic Bézier segments require just three control points. Gradient control point indices 4 to 5 of the indexed link 720 both refer to index 4 of the control point coordinate array 710, which are the coordinate values of the single gradient control point of the (non-rational) Quadratic Bézier segment 700. As will be made clear in discussing FIG. 8, it is advantageous that the index for second control point 704 is an even value (4) to designate this segment is a non-rational Quadratic Bézier segment rather than a rational one.

Figure 8:
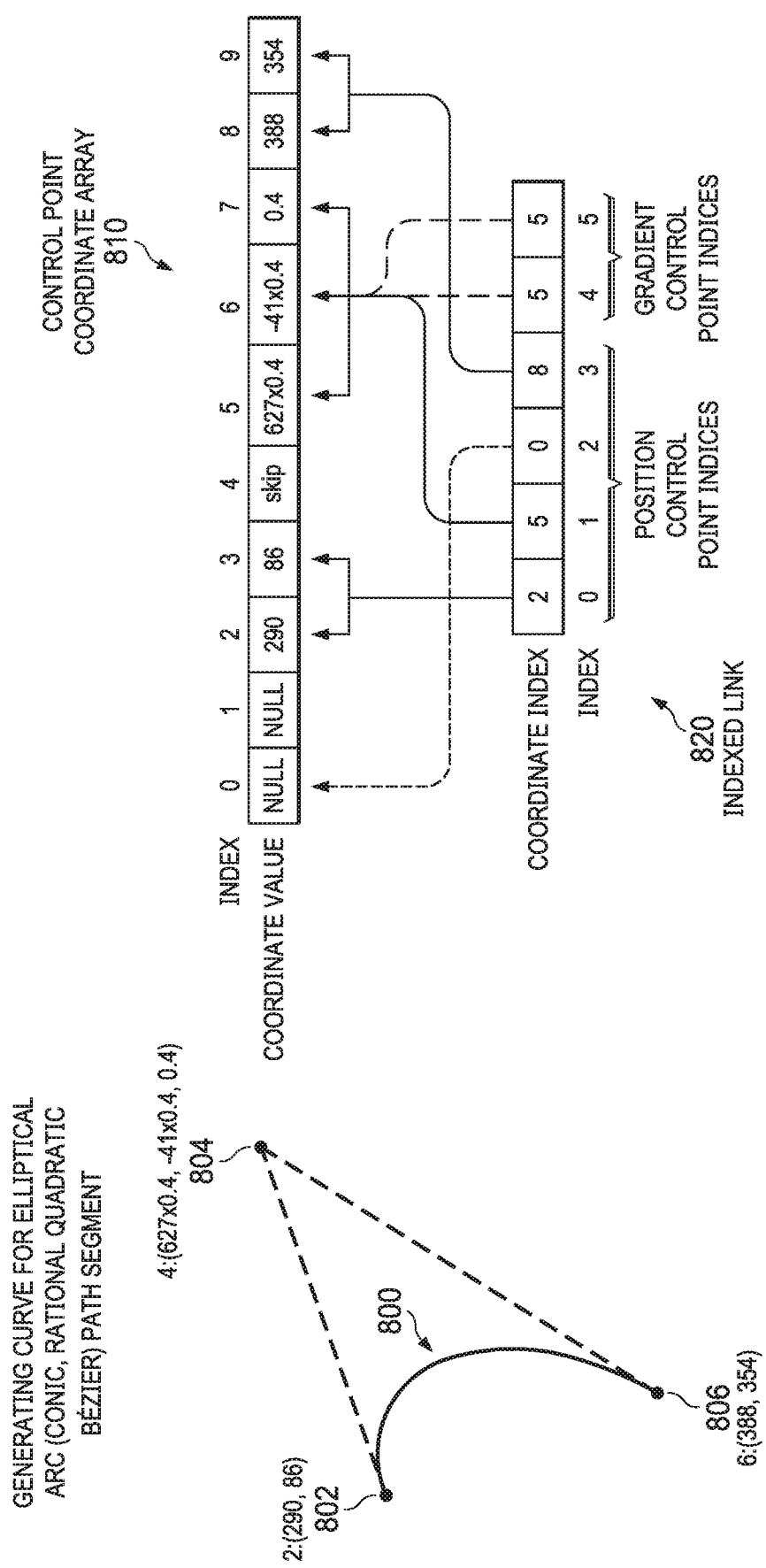

As noted in FIG. 7, by specifying the null index for index 2 of the indexed link 720, the index linked 720 is identified as a Quadratic Bézier segment needing three (rather than four) control points. FIG. 8 shows an example of a conic (rational Quadratic Bézier) segment 800, in this case an elliptical arc, encoded by a null index for index 2 and an odd vertex index (5) for index 1 of indexed link 820 that indicates the extrapolating control points of a conic segment should be an (x,y,w) position rather than simply (x,y) and fetched and transformed appropriately. As such, the combination of the odd index (index 5 of control point array 810) for index 2 with the null index for index 1 indicates that the segment encoded by indexed link 820 is not only a conventional (non-rational) Quadratic Bézier segment, but a conic segment that is a rational Quadratic Bézier segment. In addition to the conic segment 800 and the indexed link 820, FIG. 8 also includes control point coordinate array 810.

The conic segment 800 includes three control points, denoted as first control point 802, second control point 804, and third control point 806, which each have coordinate values that are stored in control point coordinate array 810. A skilled practitioner will recognize the value of encoding a rational quadratic Bézier segment as such rational segments can exactly represent conics including circular arcs, elliptical arcs, and hyperbolic arcs, as opposed to non-rational quadratic Bézier segments that are limited to representing parabolic segments. As any rational quadratic Bézier curve encoding a conic can be normalized so that just the second control point is rational, the encoding for a rational quadric Bézier segment needs to support a three-component (x,y,w) second control point. Control point coordinate array 810 has ten indices that include the coordinate values of the first control point 802 in indices 2 to 3, the coordinate values of the second and third control points 804 and 806 in indices 5 through 9, and null values in indices 0 to 1. Control point coordinate array 810 provides no particular value for index 4 as the even index value 4 is skipped in favor of index 5, an odd value, in order to designate the segment as a rational Quadratic Bézier segment and encode a three-component homogeneous coordinate for second control point 804. A skilled practitioner will recognize how this encoding efficiently distinguishes non-rational (even index) and rational (odd index) Quadratic Bézier segments and allows for a three-component (x,y,w) second control point 804. Position control point indices 0 through 3 of the indexed link 820 refer to indices 2, 5, 0 (null), and 8 of the control point coordinate array 810. Gradient control point indices 4 to 5 of the indexed link 820 both refer to index 5 of the control point coordinate array 810, which are the coordinate values of the single gradient control point of the conic segment 800.

Figure 9:
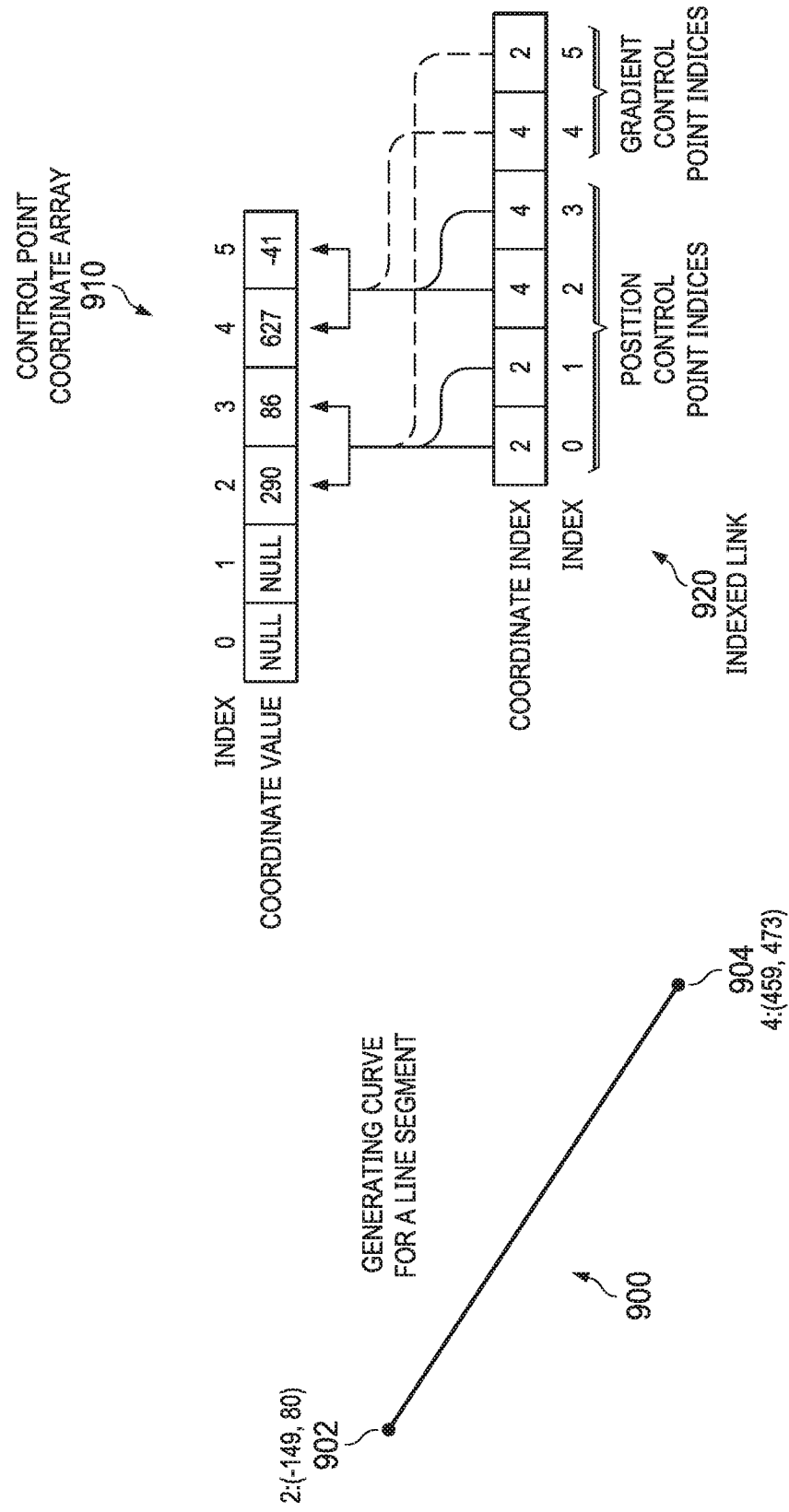

FIG. 9 illustrates a line segment 900, a corresponding control point coordinate array 910, and indexed link 920. The (non-rational) Quadratic Bézier segment 900 includes three control points, denoted as first control point 902 and second control point 904, which each have coordinate values that are stored in the control point coordinate array 910. Control point coordinate array 910 has six indices that include the coordinate values of the first and second control points 902, 904, and null values in indices 0 to 1. Position control point indices 0 through 3 of the indexed link 920 refer to indices 2 and 4 of the control point coordinate array 910. Gradient control point indices 4 to 5 of the indexed link 920 refer to indices 4 and 2 of the control point coordinate array 910. A skilled practitioner will recognize any encoding of coordinate value indices 2 and 4 in indexed link index values 1 and 2 would also generate a line segment.

While FIGS. 6-9 illustrate path segments and examples of control point coordinate arrays and indexed links for each of the individual path segments, FIGS. 10-14 illustrate the path 100, the various links of the path 100, an example of a control point coordinate array 1010 for the path 100, and examples of indexed links for the particular links of the path 100 that reference the control point coordinate array. The control point coordinate array 1010 includes sixteen indices with indices 2 through 15 including the control point coordinate values for the control points of the path 100 and indices 0 to 1 having null values. The indexed links of FIGS. 10-14 include six indices that refer to particular indices of the control point coordinate array 1010 to encode a particular link of the path 100. FIGS. 10-14 show that the same data structure is used to encode all of the links, both segments and junctions, of the path 100.

Figure 10:
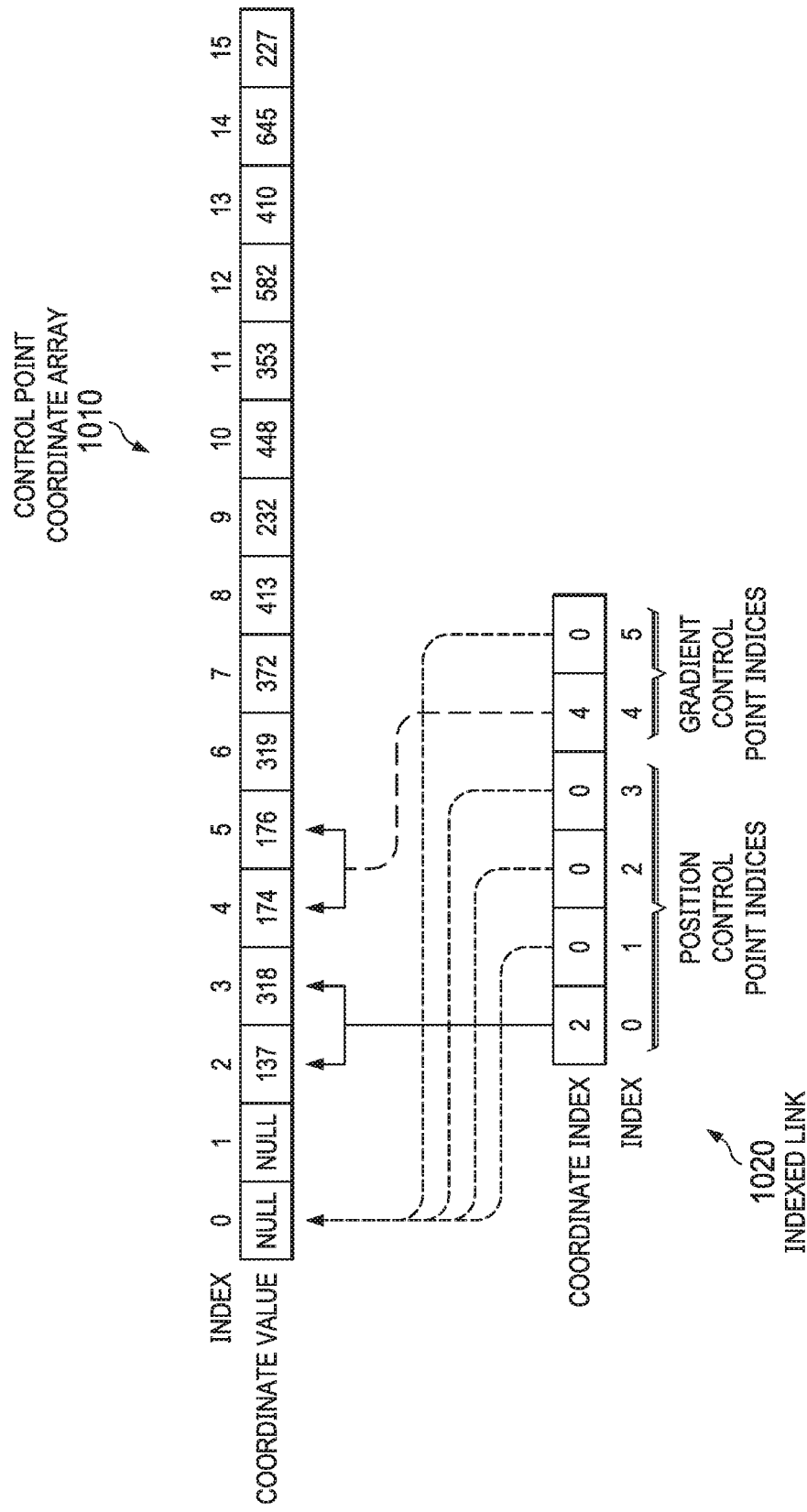

FIG. 10 illustrates indexed link 1020 for encoding initial cap 110 of path 100. Index 2 of indexed link 1020 refers to index 2 of the control point coordinate array 1010 that includes the first coordinate of the first control point 161 of the path 100. The remaining control point indices 1 to 3 of the indexed link 1020 (and index 5) refer to index 0 and the null value of control point coordinate array 1010. Index 4 refers to index 4 of the control point coordinate array 1010 and the first coordinate value of the gradient control point 162.

Figure 11:
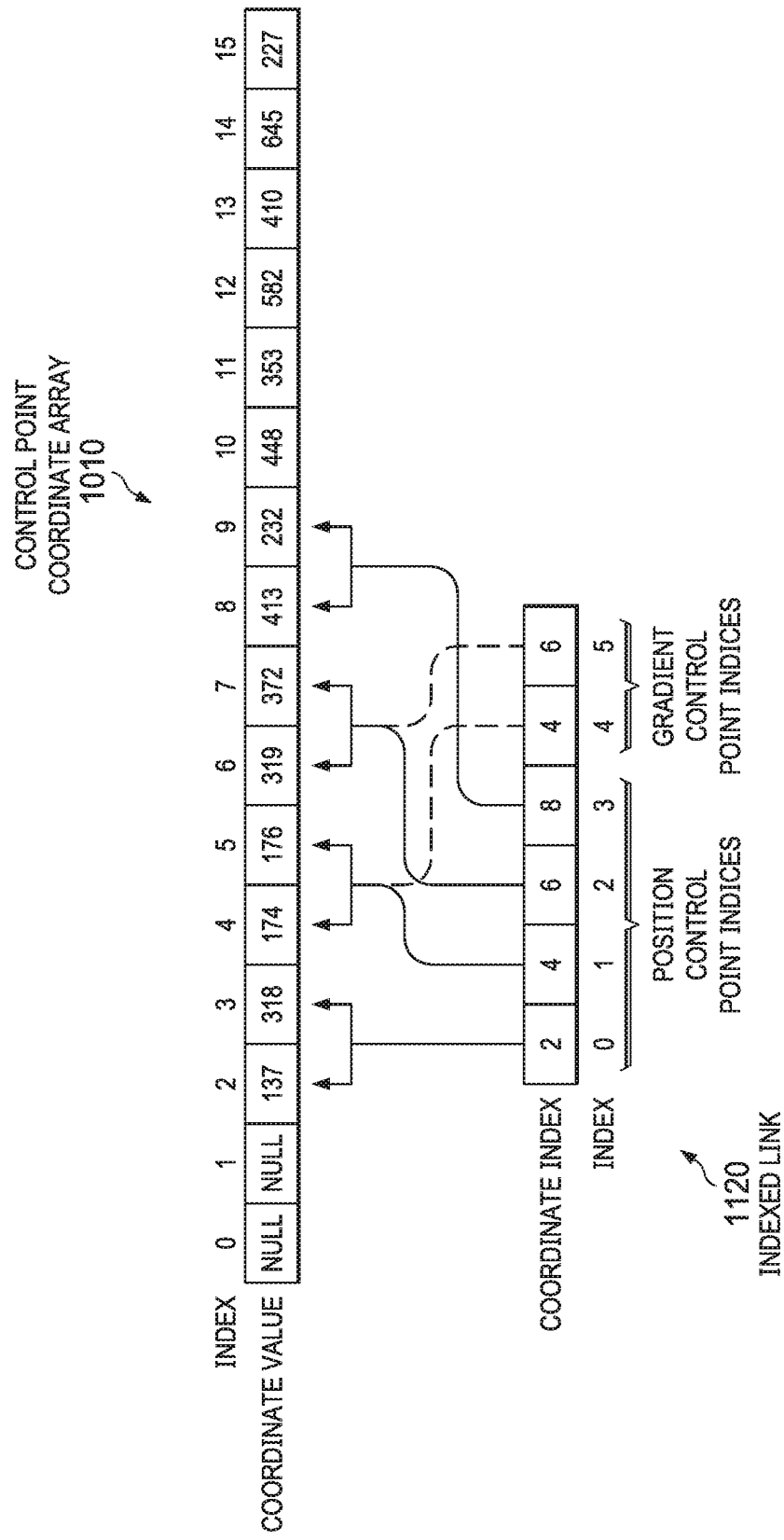

FIG. 11 illustrates indexed link 1120 for encoding segment 120 of path 100. Indices 0 to 3 of indexed link 1120 refer to indices 2, 4, 6, and 8 of the control point coordinate array 1010 that include the first coordinate of the four control points 161, 162 163, and 164, segment 120; indices 4-5 refer to indices 4 and 6 of the control point coordinate array 1010 and the first coordinate value of the gradient control points 162 and 163 of the segment 120.

Figure 12:
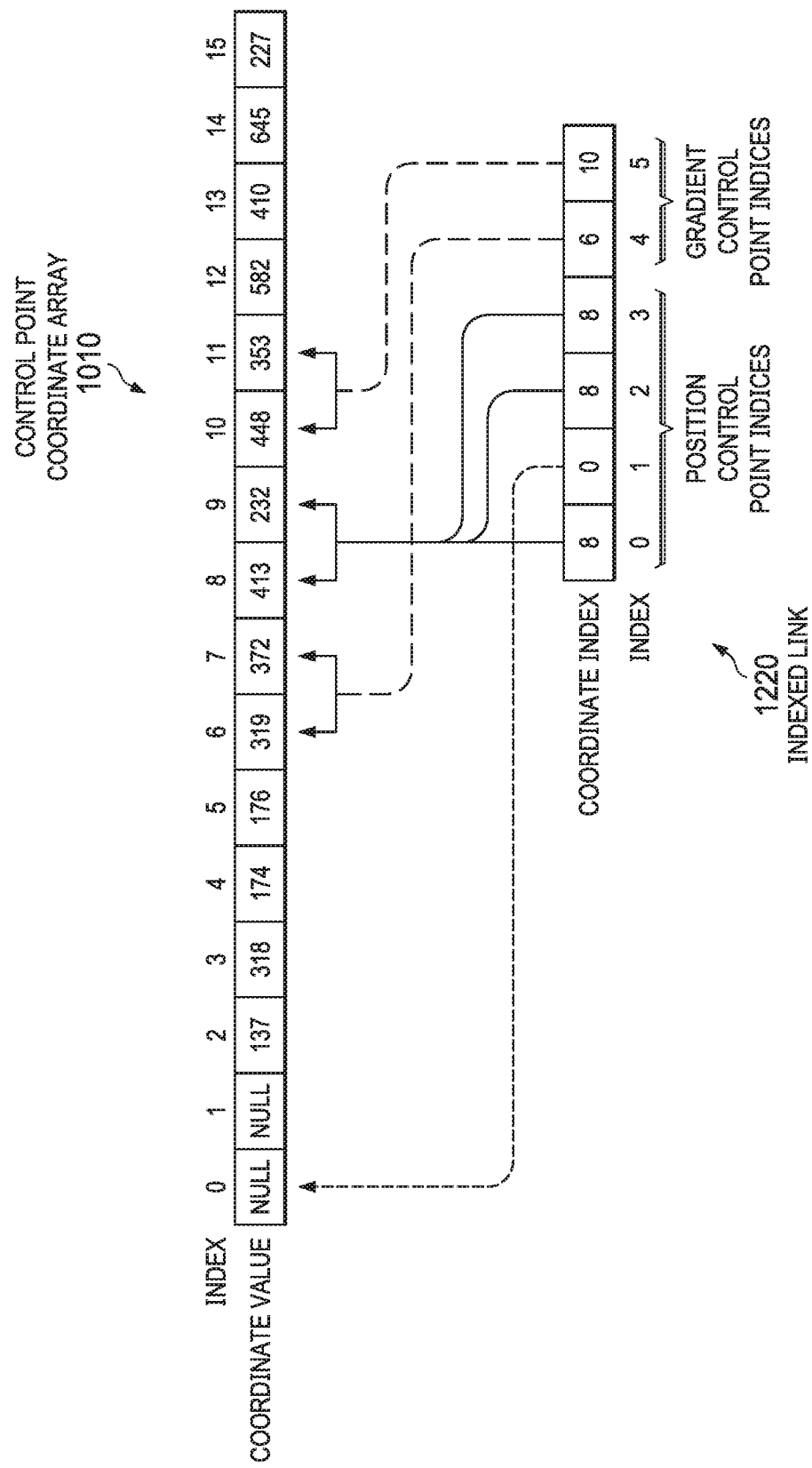

FIG. 12 illustrates indexed link 1220 for encoding join 130 of path 100. Indices 0 and 2 to 3 of indexed link 1220 refer to index 8 of the control point coordinate array 1010 that includes the first coordinate of the control point 164. Index 1 refers to index 0 of the control point coordinate array 1010 and the null value stored therein. Indices 4-5 refer to indices 6 and 10 of the control point coordinate array 1010 and the first coordinate value of the gradient control points 163 and 164.

Figure 13:
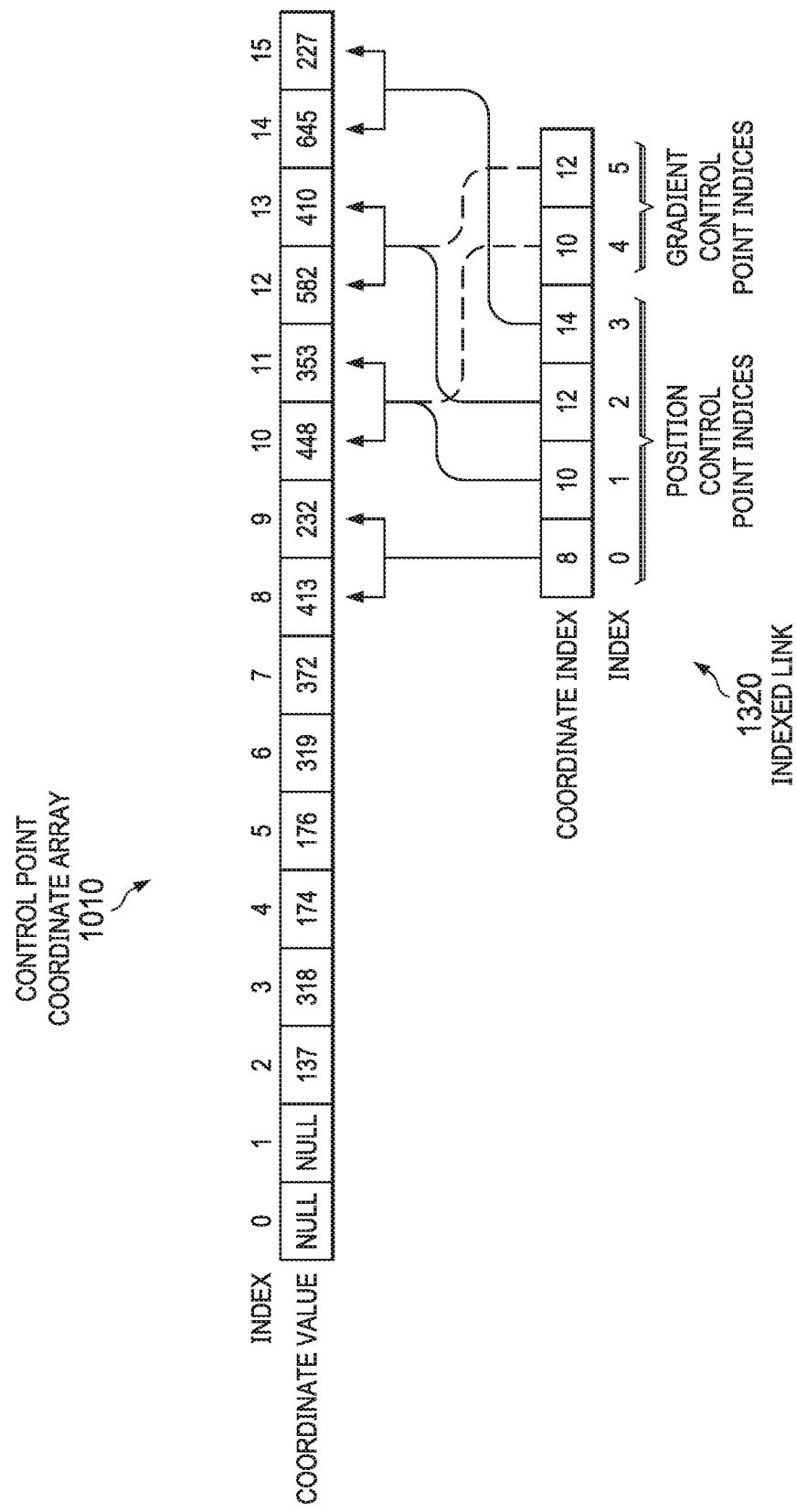

FIG. 13 illustrates indexed link 1320 for encoding segment 140 of path 100. Indices 0 to 3 of indexed link 1320 refer to indices 8, 10, 12, and 14 of the control point coordinate array 1010 that include the first coordinate of the four control points 164, 165 166, and 167 of segment 140; indices 4-5 refer to indices 10 and 12 of the control point coordinate array 1010 and the first coordinate value of the gradient control points 165 and 166 of the segment 140.

Figure 14:
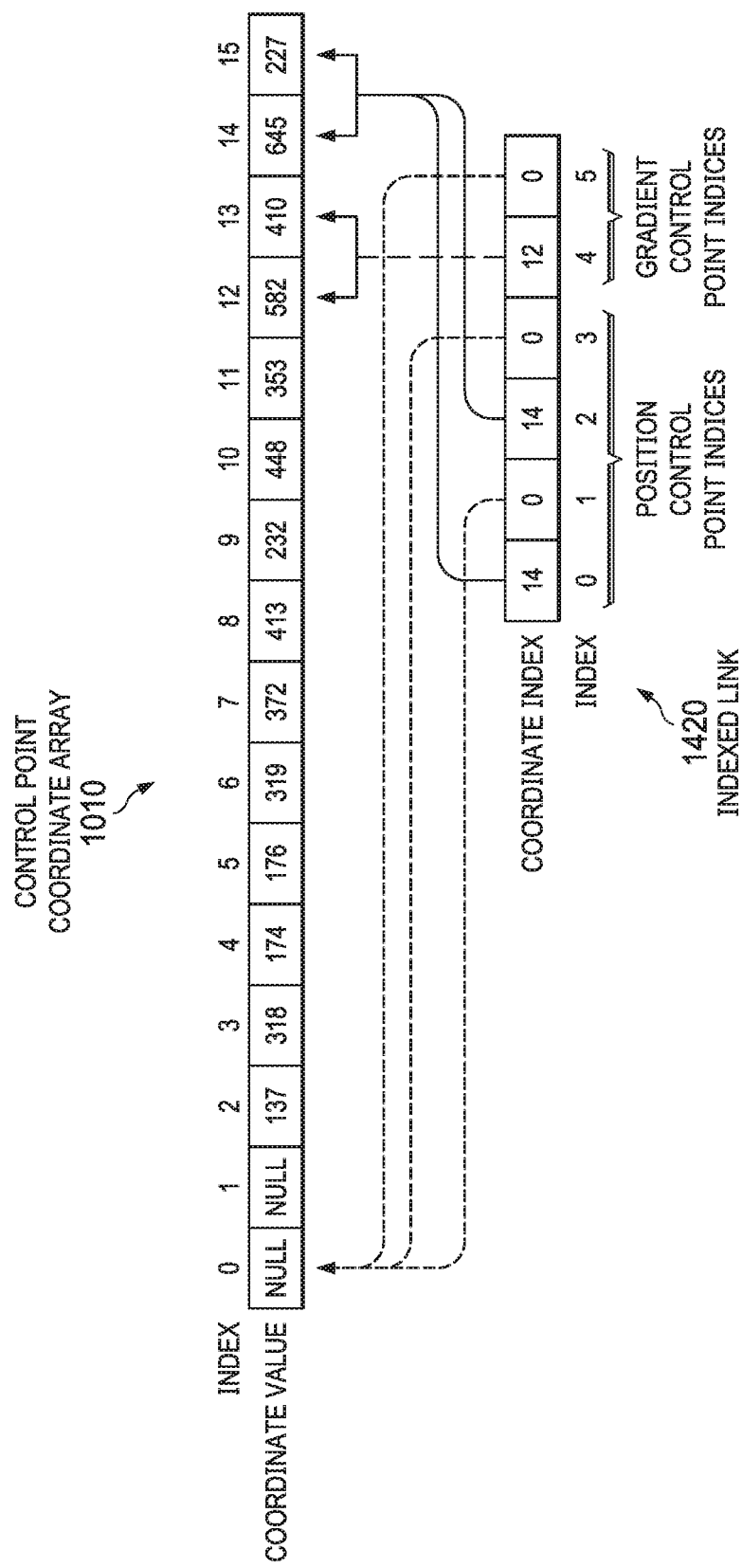

FIG. 14 illustrates indexed link 1420 for encoding terminal cap 150 of path 100. Indices 0 and 2 of indexed link 1420 refer to index 14 of the control point coordinate array 1010 that includes the first coordinate of final control point 167. The remaining control point indices 1 and 3 of the indexed link 1420 (and index 5) refer to index 0 and the null value of control point coordinate array 1010. Index 4 refers to index 12 of the control point coordinate array 1010 and the first coordinate value of the gradient control point 166.

FIG. 15 illustrates an indexed link sequence 1520 of the path 100 based on the individual indexed links for each of the links of the path 100 as represented in FIGS. 10 to 14. The indexed link sequence 1520 represents a complete baked sequence of the five links of path 100 that, along with the control point coordinate array 1010, can be stored in a memory and processed to render a stroked path. For example, the two arrays of FIG. 15, the control point coordinate array 1010 and the indexed link sequence 1520, can be stored in a GPU video memory, packed sequentially into a single buffer, and then processed by polar stroking shaders, such as discussed above regarding FIGS. 2 to 4, to render a stroked path of the path 100.

FIG. 16 illustrates a flow diagram of an example of a method 1600 of determining a link type from an encoded indexed link carried out according to the principles of the disclosure. The method 1600 provides an example of decoding indexed links respectively for the (non-rational) Quadratic Bézier and conic (rational Quadratic Bézier) segments in FIGS. 7 and 8. The method 1600 also decodes the initial and terminal path cap indexed links in FIGS. 10 and 14 as well as the join index link in FIG. 12. Other methods of encoding indexed links and, accordingly, decoding the encoded indexed links are possible according to the principles of the disclosure. All of the indices noted in the method 1600 are of an indexed link that indexes stored values of a control point coordinate array. The method 1600 can be carried out by a path processor, such as the path processor 210 of FIG. 2. The method 1600 begins in step 1601.

In step 1605, a determination is made if index 1 is null. If not, the method 1600 continues to step 1610 and a determination is made in step 1610 if index 2 is null. If not, method 1600 determines in step 1615 that the link is a cubic path segment. If index 2 is determined to be null in step 1610, then the method 1600 continues to step 1620 wherein a determination is made if index 1 is even. If yes, the method 1600 determines in step 1625 that the link is a non-rational quadratic path segment. If index 1 is not even, then the method 1600 determines in step 1630 that the link is a rational quadratic (conic) path segment.

Returning to step 1605, if index 1 is null, the method 1600 continues to step 1640 where a determination is made if index 5 is null. If not, the method 1600 determines in step 1645 that the link is a join. If index 5 is null, the method continues to step 1650 where a determination is made if index 3 is null. If so, another determination is made in step 1655 if index 2 is null. If yes, the method 1600 determines in step 1660 that the link is an initial path cap. If not, the method 1600 determines in step 1670 that the link is a terminal path cap.

Returning to step 1650, if index 3 is not null, the method 1600 determines in step 1680 if index 2 is null. If yes, the method 1600 determines in step 1685 that the link is an initial dash cap. If not, the method 1600 determines in step 1670 that the link is a terminal dash cap. A skilled practitioner will recognize that some vector graphics standards (e.g. XML Paper Specification (XPS)) provide a distinct dash cap from end-point dash caps so distinguishing these two types of caps is advantageous.

FIG. 17 illustrates a block diagram of an example of a computing device 1700 configured to display a path according to the principles of the disclosure. Path 100 is used as an example. The computing device 1700 can be, for example, a laptop, a desktop, a computing pad, a television (including a set-top box), or a smart phone. The computing device 1700 includes a stroking system 1710 and a screen 1720. The computing device 1700 can also include additional components, such as a framebuffer, typically included in a computing device configured to display images on a screen thereof. The stroking system 1710 can be configured to operate as the stroking system 200, the renderer 300, the renderer 400, or according to a stroking method as disclosed herein. The stroking system 1710 generates representations of the path 100 and provides the representations to the screen 1720 to display the path 100. The representations can be tessellated geometric primitives. The screen 1720 can be a conventional screen of a computing device that is used to display images.

FIG. 18 illustrates a block diagram of an example of a printer 1800 configured to print a path employing stroking according to the principles of the disclosure. Path 100 is used as an example path. The printer 1800 includes a stroking system 1810, a controller 1820, and a printing mechanism 1830. The printer 1800 can also include additional components typically included in a printer configured to print images. The stroking system 1810 can be configured to operate as the stroking system 200, the renderer 300, the renderer 400, or according to a stroking method disclosed herein. The stroking system 1810 generates stroked representations, such as tessellated geometric primitives, of the path 100 and provides the stroked representations to the controller 1820. The controller 1820 employs the stroked representations to generate print commands to direct the printing mechanism 1830 to print the path 100 based on the stroked representations. The printing mechanism 1830 can be a conventional component of a printer, such as a pen, that is used to print images. The printed path 100 is shown on a piece of paper 1840.

A portion of the above-described apparatus, systems or methods may be embodied in or performed by various digital data processors or computers, wherein the computers are programmed or store executable programs of sequences of software instructions to perform one or more of the steps of the methods. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein. The data storage media can be part of or associated with the digital data processors or computers.

The digital data processors or computers can be comprised of one or more GPUs, one or more CPUs, one or more of other processor types, or a combination thereof. The digital data processors and computers can be located proximate each other, proximate a user, in a cloud environment, a data center, or located in a combination thereof. For example, some components can be located proximate the user and some components can be located in a cloud environment or data center.

The GPUs can be embodied on a single semiconductor substrate, included in a system with one or more other devices such as additional GPUs, a memory, and a CPU. The GPUs may be included on a graphics card that includes one or more memory devices and is configured to interface with a motherboard of a computer. The GPUs may be integrated GPUs (iGPUs) that are co-located with a CPU on a single chip. Configured means, for example, designed, constructed, or programmed, with the necessary logic and/or features for performing a task or tasks.

Various aspects of the disclosure can be claimed including the systems and methods as noted in the summary. Each of the aspects noted in the summary may have one or more of the elements of the dependent claims presented below in combination.

Those skilled in the art to which this application relates will appreciate that other and further additions, deletions, substitutions and modifications may be made to the described embodiments.

What is claimed is:

1. A method of encoding a path, comprising:
receiving a path having multiple links, wherein the links include at least one segment and at least one junction; and
generating an encoded path by encoding the links based on positional information of the links, wherein the encoding employs a same data structure for each of the links.

2. The method as recited in claim 1, wherein the data structure is an indexed link that specifies control points for each of the links by control point indices into a control point coordinate array.

3. The method as recited in claim 2, wherein the control point coordinate array includes at least one null value.

4. The method as recited in claim 3, wherein the indexed link includes at least six control point indices.

5. The method as recited in claim 3, wherein the indexed link indicates a link type based on a presence or absence of null index values.

6. The method as recited in claim 2, wherein receiving the path includes receiving the control points for the links of the path, and the method further comprises generating the control point coordinate array for the path from coordinates of the control points.

7. The method as recited in claim 1, wherein the links include at least two segments selected from the list consisting of:
a cubic Bézier segment,
a quadratic Bézier segment,
a conic segment, and
a line segment.

8. The method as recited in claim 1, wherein the junction is a join.

9. The method as recited in claim 1, wherein the junction is a cap.

10. The method as recited in claim 1, further comprising tessellating, employing a stroking processor, the encoded path into geometric primitives corresponding to a stroked region of the path.

11. The method as recited in claim 10, wherein the stroking processor is a graphics processing unit (GPU).

12. The method as recited in claim 11, wherein the GPU rasterizes the tessellated geometric primitives into a framebuffer.

13. The method of claim 11, wherein the tessellating is performed by programmable GPU tessellation shaders executing on the GPU.

14. The method of claim 11, wherein the tessellating is performed by mesh shaders executing on the GPU.

15. A stroking system for paths, comprising:
a path processor configured to decompose a path into links and encode the links, wherein the links include at least one segment and at least one junction, wherein the path processor is configured to encode the path employing a same data structure for each of the links; and
a stroking processor configured to tessellate the encoded path into geometric primitives corresponding to a stroked region of the path.

16. The system as recited in claim 15, wherein the data structure is an indexed link that specifies control points for each of the links by control point indices into a control point coordinate array of the path.

17. The system as recited in claim 16, wherein the path processor is configured to generate the control point coordinate array from coordinates of the control points.

18. The system as recited in claim 16, wherein the control point coordinate array includes at least one null value and the indexed link indicates a link type based on a presence or absence of null index values.

19. The system as recited in claim 15, wherein the at least one segment is a cubic Bézier segment, a quadratic Bézier segment, a conic segment, or a line segment, and the at least one junction is a join or a cap.

20. The system as recited in claim 15, wherein the stroking processor is a graphics processing unit (GPU).

21. The system as recited in claim 20, wherein the GPU is further configured to rasterize the tessellated geometric primitives into a framebuffer.

22. The system as recited in claim 20, wherein programmable GPU tessellation shaders executing on the GPU are configured to tessellate the encoded path into the geometric primitives.

23. The system as recited in claim 20, wherein vertex shaders executing on the GPU are configured to tessellate the encoded path into the geometric primitives.

24. The system as recited in claim 20, wherein the geometric primitives are polygons.

25. The system as recited in claim 24, wherein the polygons are quadrilaterals.

26. A computing device comprising the system as recited in claim 20 and a screen configured to display an image of the path based on the geometric primitives.

27. A computing device as recited in claim 26, wherein the computing device is a smart phone.

28. A printer comprising the system as recited in claim 20 and a printing mechanism configured to print the path based on the geometric primitives.

29. A renderer, comprising:
a first processor configured to decompose a path into links, wherein the links include one or more segment and one or more junction, and encode the links as indexed links; and
a second processor configured to generate a stroked tessellation of the path based on a polar stroked representation of each of the links employing the indexed links.

30. The renderer as recited in claim 29, wherein the first processor comprises a central processing unit (CPU), and the second processor comprises a graphics processing unit (GPU).

31. The renderer as recited in claim 30, wherein the GPU includes a programmable graphics pipeline with programmable shader stages and fixed-function stages configured to generate the polar stroked representations, wherein the programmable shader stages include at least one polar stroking shader.

32. The renderer as recited in claim 29, wherein the indexed links specify control points for each of the links by control point indices into a control point coordinate array.

33. The renderer as recited in claim 32, wherein the control point coordinate array includes at least two null values and coordinates of control points of the links.

34. The renderer as recited in claim 29, wherein the indexed links indicates a link type based on the presence or absence of one or more null index values.

35. The renderer as recited in claim 29, wherein the links include a segment that is a a cubic Bézier segment, a quadratic Bézier segment, a conic segment, or a line segment, and a junction that is an initial cap, a terminal cap, or a join.

36. The renderer as recited in claim 29, wherein the polar stroked representation of each of the links is a sequence of quadrilaterals.

37. A method of determining a type of link of a path from a data structure, comprising:
   analyzing a data structure that encodes a link, the data structure having multiple indices that refer to a control point coordinate array corresponding to the link; and
   determining a type of the link based on a presence of at least one index null value for at least one of the indices.

38. The method as recited in claim 37, wherein the type is a segment or a junction.

39. The method as recited in claim 37, wherein the type is based on the presence of multiple indices having index null values.

40. A method of encoding a path, the path comprising a plurality of segments and a plurality of junctions connecting respective consecutive adjacent pairs of the segments, the method comprising:
   for each of the segments, and using a same representation format for each of the segments, encoding the segment as a first indexed link; and
   for each of the junctions, and using the same representation format, encoding the junction as a second indexed link;
   wherein each segment is a cubic Bézier segment, a quadratic Bézier segment, a conic segment, or a line segment;
   wherein each junction is a cap or a join; and
   wherein the first and second indexed link includes a field whose value indicates whether a segment or a junction is encoded in a given instance.

* * * * *